(12) United States Patent
Dilley et al.

(10) Patent No.: US 10,892,682 B2
(45) Date of Patent: Jan. 12, 2021

(54) POWER CONVERTER WITH CONTROLLABLE DC OFFSET

(71) Applicant: EPC Power Corporation, Poway, CA (US)

(72) Inventors: Devin Dilley, Lakeside, CA (US); Ryan Smith, San Diego, CA (US)

(73) Assignee: EPC Power Corporation, Poway, CA (US)

( * ) Notice: Subject to any disclaimer, the term of this patent is extended or adjusted under 35 U.S.C. 154(b) by 0 days.

(21) Appl. No.: 15/995,844

(22) Filed: Jun. 1, 2018

(65) Prior Publication Data

US 2018/0278161 A1 Sep. 27, 2018

Related U.S. Application Data

(63) Continuation of application No. 15/136,643, filed on Apr. 22, 2016, now Pat. No. 9,991,795.

(Continued)

(51) Int. Cl.
*H02M 3/335* (2006.01)
*H02M 3/158* (2006.01)
(Continued)

(52) U.S. Cl.
CPC ......... *H02M 3/158* (2013.01); *H02M 7/2173* (2013.01); *H02M 7/797* (2013.01);
(Continued)

(58) Field of Classification Search
CPC ............ H02M 1/10; H02M 1/12; H02M 1/32; H02M 2001/0058; H02M 2001/123;
(Continued)

(56) References Cited

U.S. PATENT DOCUMENTS 6,084,785 A 7/2000 Kunisada et al.
6,134,126 A 10/2000 Ikekame et al.
(Continued)

FOREIGN PATENT DOCUMENTS

CN 1921279 2/2007
CN 103124142 A 5/2013
(Continued)

OTHER PUBLICATIONS

International Search Report and Written Opinion on PCT/US2016/029028, dated Jul. 27, 2016.

(Continued)

*Primary Examiner* — Jue Zhang
*Assistant Examiner* — David A. Singh
(74) *Attorney, Agent, or Firm* — Foley & Lardner LLP

(57) ABSTRACT

An electrical power conversion system includes an alternating current (AC)-to-direct current (DC) power converter that is configured to convert power between AC power and DC power. The AC-to-DC power converter includes switching legs that each connect to a phase of the AC power. Each of the switching legs includes two electronic devices connected in series with one another between a positive DC bus terminal and a negative DC bus terminal. The electrical power conversion system also includes a DC-to-DC power converter that is configured to convert power between the DC bus power and DC terminal power via a positive DC terminal and a negative DC terminal. The DC-to-DC power converter is configured to control a differential voltage between the positive and negative DC terminals and a common-mode voltage that is between a neutral of the AC power and each of the positive and negative DC terminals.

13 Claims, 11 Drawing Sheets

Related U.S. Application Data

(60) Provisional application No. 62/152,774, filed on Apr. 24, 2015.

(51) Int. Cl.
  *H02M 7/217* (2006.01)
  *H02M 7/797* (2006.01)
  *H02M 1/00* (2006.01)
  *H02M 1/12* (2006.01)

(52) U.S. Cl.
  CPC ........ *H02M 3/1582* (2013.01); *H02M 3/1588* (2013.01); *H02M 3/335* (2013.01); *H02M 2001/007* (2013.01); *H02M 2001/0009* (2013.01); *H02M 2001/0048* (2013.01); *H02M 2001/123* (2013.01); *Y02B 70/10* (2013.01)

(58) Field of Classification Search
  CPC ........... H02M 2001/325; H02M 7/219; H02M 7/4826; H02M 7/49; H02M 2007/2195; H02M 2007/4815
  USPC ............................................. 363/17, 37, 126
  See application file for complete search history.

(56) References Cited

U.S. PATENT DOCUMENTS

| | | | |
|---|---|---|---|
| 6,301,130 B1 | 10/2001 | Aiello et al. | |
| 6,977,492 B2 | 12/2005 | Sutardja et al. | |
| 7,495,938 B2 | 2/2009 | Wu et al. | |
| 8,988,026 B2 | 3/2015 | Ahmed et al. | |
| 9,397,580 B1 | 7/2016 | Alexander | |
| 2002/0074974 A1 | 6/2002 | Shinba | |
| 2006/0034364 A1 | 2/2006 | Breitzmann et al. | |
| 2010/0172162 A1* | 7/2010 | Tallam | H02M 1/44 363/37 |
| 2012/0081932 A1 | 4/2012 | Videt et al. | |
| 2012/0268976 A1 | 10/2012 | Yan et al. | |
| 2012/0307531 A1 | 12/2012 | Toliyat et al. | |
| 2013/0182467 A1 | 7/2013 | Cross et al. | |
| 2013/0322132 A1 | 12/2013 | Wijekoon et al. | |
| 2014/0268933 A1 | 9/2014 | Zhou et al. | |
| 2015/0003115 A1 | 1/2015 | Barron et al. | |
| 2015/0070956 A1* | 3/2015 | Mu | H02M 7/53871 363/132 |
| 2015/0131345 A1 | 5/2015 | Purhonen et al. | |
| 2015/0180356 A1* | 6/2015 | Norisada | H02M 3/3353 363/17 |
| 2015/0194902 A1* | 7/2015 | Tian | H02M 5/458 363/37 |

FOREIGN PATENT DOCUMENTS

| | | |
|---|---|---|
| EP | 2 624 433 A1 | 8/2013 |
| JP | 59-216489 | 12/1984 |
| JP | 2003-018853 A | 1/2003 |
| WO | WO-2008/024529 | 2/2008 |
| WO | WO-2014/127330 | 10/2014 |

OTHER PUBLICATIONS

Microchip SMPS ACDC Reference Design User's Guide 2008 Microchip Technology.
U.S. Office Action in U.S. Appl. No. 15/136,643 dated Jul. 28, 2017.
U.S. Office Action in U.S. Appl. No. 15/136,643 dated Aug. 9, 2016.
U.S. Office Action in U.S. Appl. No. 15/136,643 dated Jan. 25, 2017.
English Translation of Office Action Received for Chinese Application No. 201680035830.5, dated Oct. 9, 2018, 4 pages.
Extended European Search Report for European Application No. 16784023.0, dated Dec. 4, 2018, 11 pages.
Hyeoun-Dong Lee et al., "A Common Mod Voltage Reduction in Boost Rectifier/Inverter System by Shifting Active Voltage Vector in a Control Period", IEEE Transactions on Power Electronics, Institute of Electrical and Electronics Engineers, vol. 15, No. 6, Nov. 1, 2000, 8 pages.
Examination Report for European Application No. 16784023.0, dated Oct. 8, 2019, 12 pages.
Examination Report for Indian Application No. 201717041336, dated Jun. 4, 2020, 6 pages.
Eugen Coca et al, "An Evaluation of EMI Power Line Filters for Switching Power Supplies", S.C. "Electrica" S.A. SDE Suceava, 24, Stefan cel Mare, 5800, Suceava, Romania, Dec. 31, 1998, 6 pages.
Examination Report received for European Application No. 16784023.0, dated Aug. 3, 2020, 6 pages.
Kotny et al, "Design of EMI Filters for DC-DC Converter", Vehicle Power and Propulsion Conference, Univ. Lille Nord de France, Sep. 1, 2020, 6 pages.
Wong, Kerry D., "A Short Guide on Moto Electrical Noise Reduction", Blog Archive, Jan. 26, 2012, 4 pages.

* cited by examiner

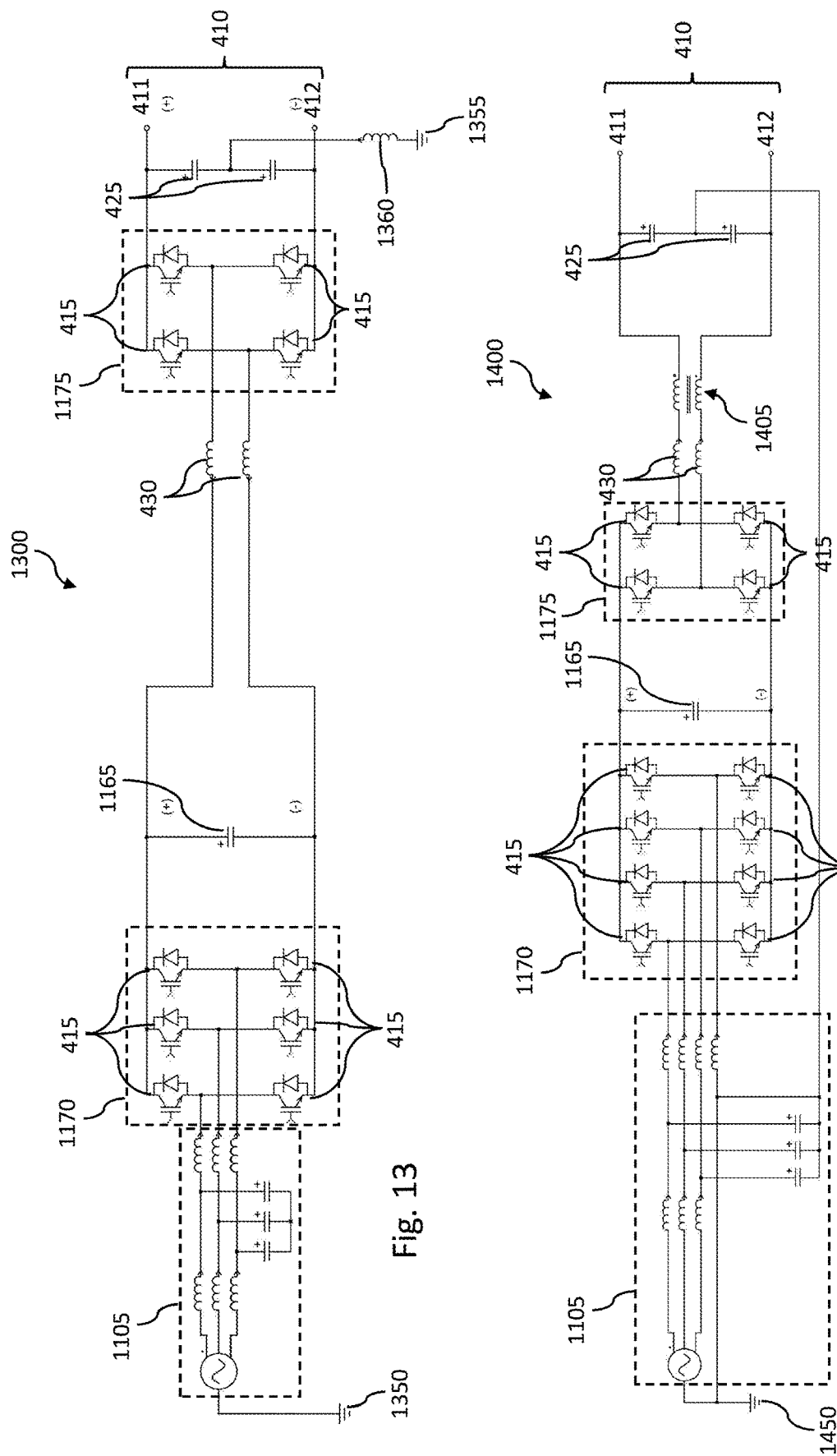

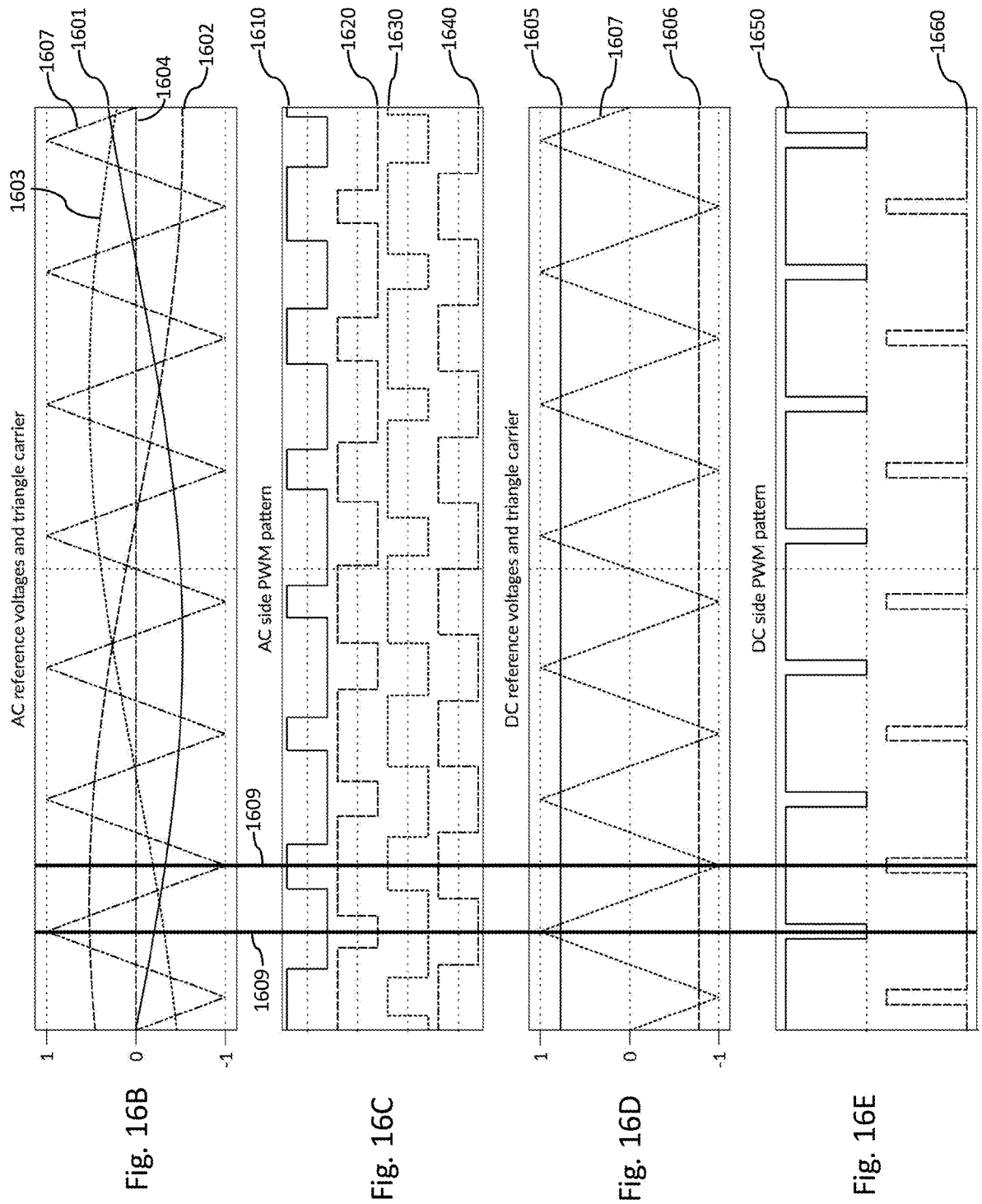

POWER CONVERTER WITH CONTROLLABLE DC OFFSET

CROSS REFERENCE TO RELATED APPLICATIONS

The present application is a continuation of U.S. application Ser. No. 15/136,643, filed Apr. 22, 2016, which claims priority to U.S. Provisional Application No. 62/152,774 filed Apr. 24, 2015, both of which are incorporated herein by reference in their entireties.

BACKGROUND

The following description is provided to assist the understanding of the reader. None of the information provided or references cited is admitted to be prior art. In electronics, a power converter refers to a device that converts electrical energy from one form to another. Power converters can include direct current (DC) to DC converters, rectifiers that convert alternating current (AC) to DC, inverters that convert DC to AC, transformers, etc. Power converters have a myriad of practical applications, including providing AC power to an AC device using a DC power source, providing DC power to a DC device using an AC power source, stepping a DC voltage up or down to satisfy the requirements of a particular load, etc.

SUMMARY

An illustrative electrical power conversion system includes an alternating current (AC)-to-direct current (DC) power converter that is configured to convert power between AC power and a DC bus power. The AC-to-DC power converter includes a plurality of switching legs that each connect to a phase of the AC power. Each of the plurality of switching legs includes two electronic devices connected in series with one another between a positive DC bus terminal and a negative DC bus terminal. The electrical power conversion system also includes a DC-to-DC power converter that is configured to convert power between the DC bus power and DC terminal power via a positive DC terminal and a negative DC terminal. The DC-to-DC power converter is configured to control both a differential voltage that is between the positive DC terminal and the negative DC terminal and a common-mode voltage that is between a neutral of the AC power and each of the positive DC terminal and the negative DC terminal.

An illustrative system includes a first electrical power conversion system and a second electrical power conversion system. The first electrical power conversion system includes a first alternating current (AC)-to-direct current (DC) power converter that is configured to convert power between AC power and a first DC bus power. The first AC-to-DC power converter includes a first plurality of switching legs that each connect to a phase of the AC power. Each of the first plurality of switching legs includes two electronic devices connected in series with one another between a first positive DC bus terminal and a first negative DC bus terminal. The first electrical power conversion system also includes a first DC-to-DC power converter that is configured to convert power between the first DC bus power and DC terminal power via a first positive DC terminal and a first negative DC terminal. The first DC-to-DC power converter is configured to control both a first differential voltage that is between the first positive DC terminal and the first negative DC terminal and a first common-mode voltage that is between a neutral of the AC power and each of the first positive DC terminal and the first negative DC terminal.

The second electrical power conversion system includes a second AC-to-DC power converter that is configured to convert power between the AC power and a second DC bus power. The second AC-to-DC power converter includes a second plurality of switching legs that each connect to a phase of the AC power. Each of the second plurality of switching legs includes two electronic devices connected in series with one another between a second positive DC bus terminal and a second negative DC bus terminal. The second electrical power conversion system also includes a second DC-to-DC power converter that is configured to convert power between the second DC bus power and the DC terminal power via a second positive DC terminal and a second negative DC terminal. The second DC-to-DC power converter is configured to control both a second differential voltage that is between the second positive DC terminal and the second negative DC terminal and a second common-mode voltage that is between the neutral of the AC power and each of the second positive DC terminal and the second negative DC terminal. The first positive DC terminal and the second positive DC terminal are electrically connected. The first negative DC terminal and the second negative DC terminal are electrically connected.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGS. 11-15 are circuit diagrams of AC-to-DC power converters with a controllable DC offset in accordance with illustrative embodiments.

FIGS. 16B-16E are graphs that show switching states in accordance with an illustrative embodiment.

Figure 1:
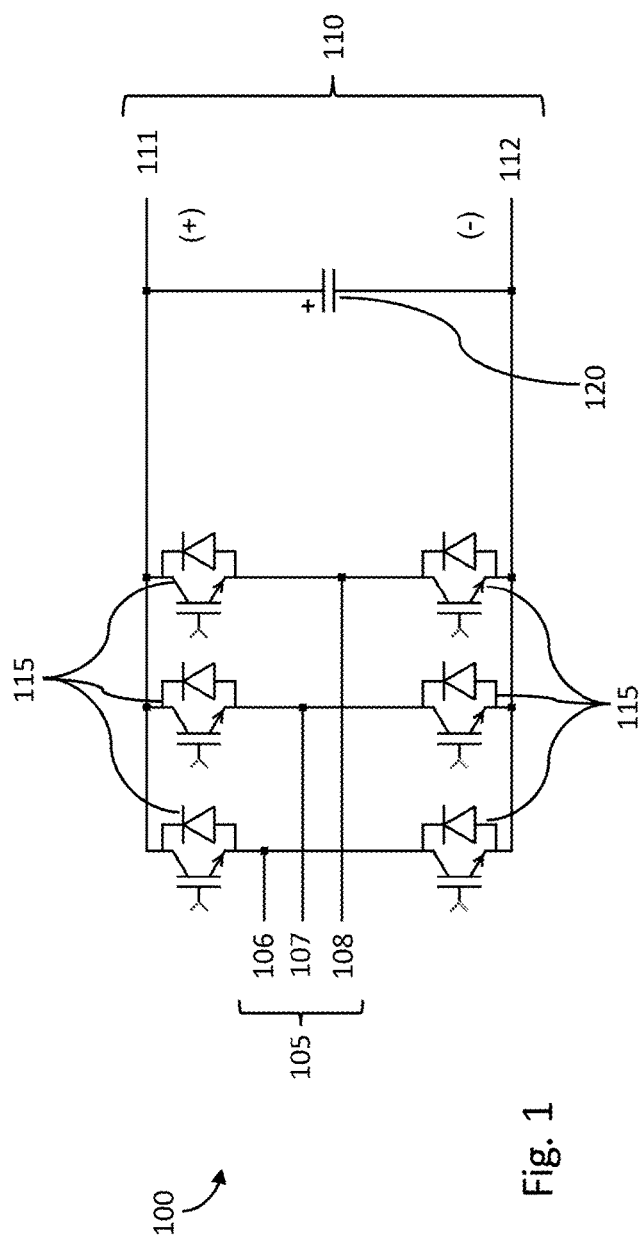
FIG. 1 is a circuit diagram of an AC-to-DC power converter in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Power converters can be used to convert one form of electrical energy into another form of electrical energy. For example, power converters can convert alternating current (AC) power into direct current power or from DC power into AC power. Power converters can converter AC power with a first voltage and frequency into AC power with a second voltage and frequency. Some power converters can convert DC power with one voltage to DC power with another voltage. In some instances, power converters can be used to intentionally control a DC offset.

One type of power converter is an AC-to-DC power converter. FIG. 1 is a circuit diagram of an AC-to-DC power converter in accordance with an illustrative embodiment. The AC-to-DC power converter 100 includes input terminals 105, output terminals 110, switches 115, and a filtering element 120. In alternative embodiments, additional, fewer, and/or different elements may be used. For example, in alternative embodiments, any suitable filtering element(s) in any suitable arrangement may be used or no filtering element(s) may be used.

As shown in FIG. 1, the input terminals 105 can include phase terminals 106, 107, and 108. Each of the phase terminals 106, 107, and 108 can be single legs of a three-phase power supply, such as from a grounded or ungrounded power grid. The three-phase power supply can be any suitable three-phase power supply such as a 480 Volt alternating current (VAC), a 120 VAC, a 240 VAC, a 600 VAC, etc. power supply. In alternative embodiments, the input terminals 105 can include phase terminals corresponding to single-phase power, two-phase power, six-phase power, etc. In some embodiments, the input terminals 105 can include phase terminals corresponding to four-wire three-phase AC power with three phase terminals each corresponding to a phase of the AC power and a phase terminal corresponding to a neutral of the AC power.

As shown in FIG. 1, each of the switches 115 can include an insulated-gate bipolar transistor (IGBT) and a diode. In alternative embodiments, the switches 115 can include any suitable transistor and/or electronic device. In some embodiments, the switches 115 may not include a diode. In the embodiment shown in FIG. 1, the AC-to-DC power converter is bidirectional. That is, the AC-to-DC power converter of FIG. 1 includes switches 115 that selectively allow power to flow through each of the switches 115 that can allow power to flow either from the terminals 105 to the terminals 110 or from the terminals 110 to the terminals 105. In an embodiment, the terminals 105 are input terminals, and the terminals 110 are output terminals (or DC bus terminals). In an alternative embodiment, the terminals 110 can be input terminals, and the terminals 105 can be output terminals.

In an alternative embodiment, some or all of the switches 115 of FIG. 1 can be replaced with passive electronic devices such as diodes. The diodes can be configured to allow power to flow in one direction through the AC-to-DC power converter 100. In such an embodiment, the AC-to-DC power converter 100 is unidirectional.

The switches 115 can be operated, such as by a controller, to produce a direct current (or substantially direct current) voltage across the output terminals 110. That is, the voltage across the DC bus terminals 111 and 112 can be a direct current voltage. However, the voltage across the DC bus terminals 111 and 112 may not be perfectly constant, but may include an intentional voltage across the DC bus terminals 111 and 112. For example, the DC bus voltage may be an average of 800 Volts (V)+/−267 V. The filtering element 120 (e.g., a capacitor) can be used to reduce the ripple in the DC bus voltage, but may intentionally not eliminate the ripple. The capacitive filtering elements of FIGS. 1-16A include a "+" sign on one side of the element. However, the "+" is not meant to indicate a polarity of the capacitive filtering element and is not meant to be limiting. For example, in alternative embodiments, the polarity of any suitable filtering element can be reversed.

Each of the circuit diagrams of FIGS. 1-15 can be either bidirectional or unidirectional. In bidirectional embodiments, circuit terminals referred to as "input" terminals can be operated to input power into the respective circuit or to output power from the respective circuit. Similarly, circuit terminals referred to as "output" terminals can be operated to output power into the respective circuit or to input power from the respective circuit. Embodiments described herein are described, in general, with respect to converting AC power into DC power for clarity of explanation. However, labels such as "input" and "output" are not meant to be limiting, and alternative embodiments can convert DC power into AC power by reversing the current flow. Similarly, in bidirectional embodiments, a "load" can be reversed to be a power supply or power source, and a power "source" or power "supply" can be reversed to be a load. Some embodiments may be unidirectional in that power can flow one direction, but not the other.

In an illustrative embodiment, the voltage across the DC bus terminals 111 and 112 is usually greater than about 1.35 times the line-to-line RMS voltage of the input terminals 105. Thus, to connect a DC load at a lower voltage than the DC bus voltage, a DC-to-DC power converter can be used to reduce the DC bus voltage to accommodate the DC voltage of the DC load. Furthermore, the DC-to-DC power converter can be used to smooth the DC power. For example, the DC voltage across the DC bus terminals 111 and 112 can be +/− one third of the DC voltage. However, the output of a DC-to-DC power converter can include a ripple that is less than 1% of the DC voltage across the DC bus terminals 111 and 112. For example, the average voltage across the DC bus terminals 111 and 112 can be 800 Volts (V), but the ripple of the output DC power of a DC-to-DC power converter can be about 1 V. In an illustrative embodiment, the DC load can be an inverter of any suitable topology (e.g. three level NPC, flying capacitor, T-type, etc.).

The switch topology shown in FIG. 1 for an AC-to-DC power converter is merely one example of an AC-to-DC power converter. In alternative embodiments, any suitable topology can be used to converter power between AC power and a DC bus power. For example, other suitable topologies include a three-level neutral point clamp (NPC) topology, a flying capacitor multilevel topology, a T-type topology, etc.

Figure 2:
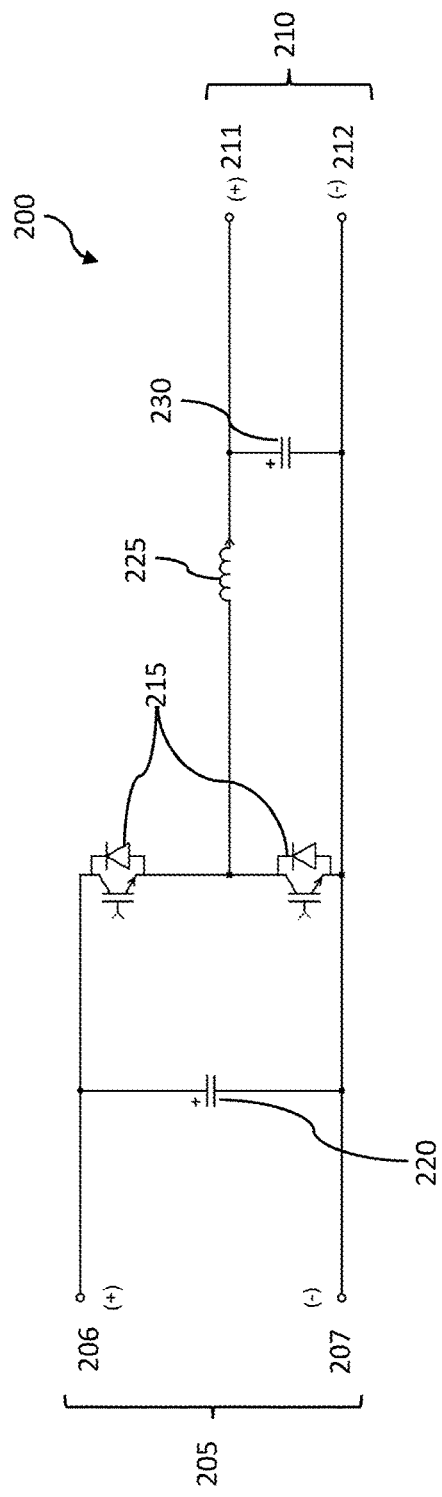
FIG. 2 is a circuit diagram of a bidirectional DC-to-DC power converter in accordance with an illustrative embodiment.

FIG. 2 is a circuit diagram of a bidirectional DC-to-DC power converter in accordance with an illustrative embodiment. The DC-to-DC power converter 200 includes input terminals 205, output terminals 210, switches 215, an input filtering element 220, and output filtering elements 225 and 230. In alternative embodiments, additional, fewer, or different elements can be used. For example, in alternative embodiments, any suitable filtering element(s) in any suitable arrangement may be used or no filtering element(s) may be used.

In an illustrative embodiment, the input terminals 205 of the DC-to-DC power converter 200 can be connected to a DC power source. In an alternative embodiment, the input terminals 205 are not power "inputs" and can be connected to a DC load. The switches 215 can be operated to reduce the voltage from the DC bus voltage across the DC bus terminals 206 and 207 to the DC output terminals 211 and 212. That is, the switches 215 can be operated such that the voltage across the DC output terminals 211 and 212 is less than the voltage across the DC bus terminals 206 and 207. The input filtering element 220 can be used to smooth the voltage across the DC bus terminals 206 and 207. The output filtering elements 225 and 230 can be used to smooth the voltage across the DC output terminals 211 and 212.

In an illustrative embodiment, the input terminals 205 of the DC-to-DC power converter 200 can be connected to the output terminals 110 of the AC-to-DC power converter 100. For example, the filtering element 120 can be the same as the filtering element 220. In such an embodiment, the three-phase power of the input terminals 105 can be converted into a DC power across the output terminals 110 (and the input terminals 205), and voltage of the DC power across the output terminals 110 can be less than the voltage across the output terminals 210. For example, the switches 215 can be operated to control the voltage across the output terminals 110 to match a voltage of a DC load connected to the output terminals 110.

In the AC-to-DC converter 100 of FIG. 1, the voltage of the input terminals 105 oscillates or rotates evenly about a reference commonly referred to as a neutral, but the output terminals 110 include a common-mode voltage with respect to the neutral. For example, the input terminals 105 can be connected to a 480 VAC three-phase power supply, and the DC voltage across the output terminals 110 (e.g., the DC bus voltage) can be 800 VDC. In some instances, the DC voltage across the output terminals 110 can include a ripple that is one third of the DC bus voltage (e.g., +/−267 V). The output terminal 111 is the positive terminal, and the output terminal 112 is the negative terminal. However, the voltage across the neutral of the input terminals 105 and the output terminal 112 can be non-zero, which is commonly referred to as a common-mode voltage. In embodiments in which the AC power does not have a neutral connection, then the "neutral" of the common-mode voltage is the instantaneous average of the phases of the AC power (e.g., the instantaneous average of all three phases of the AC power). In an illustrative embodiment, the input terminals 105 can be connected to a grid power supply in which the neutral is connected to a ground. Thus, the output terminals 110 have a common-mode voltage with respect to the ground or any other suitable common reference point. Unless specified otherwise, the term "ground" is meant to be a general term and can refer to any common point. For example, a system can include two power converters that each include their own respective ground or common point. In some instances, both of the grounding points can be connected. In other instances, the grounding points are not electrically connected. That is, the ground of one power converter can be a common reference point to that power converter, and the ground of the other power converter can be a common reference point to the same. In some instances, the two grounds can have a voltage potential.

In some instances, machines (e.g., motors) or other electrical loads can be connected to the output terminals 110 and be isolated from the ground, thereby providing the electrical loads with the DC bus voltage across the output terminals 110. For example, such electrical loads can be inverter-rated motors, battery banks, etc. However, in some instances, isolating the electrical load from the ground can cause problems. For example, two parallel AC-to-DC converters 100 with input terminals 105 connected to the same three-phase power source can have different common-mode voltages of the respective output terminals 110. In such an example, the voltage across the respective output terminals 110 can each be the same DC voltage, but with different common-mode voltages. Thus, a single electrical load cannot be connected to both output terminals 110. Similarly, when the DC-to-DC power converter 200 is connected to the output terminals 110, such as by connecting the DC bus terminal 207 with the DC bus terminal 112 and connecting the DC bus terminal 206 with the DC bus terminal 111, the output terminals 210 also include a common-mode voltage.

Figure 3:
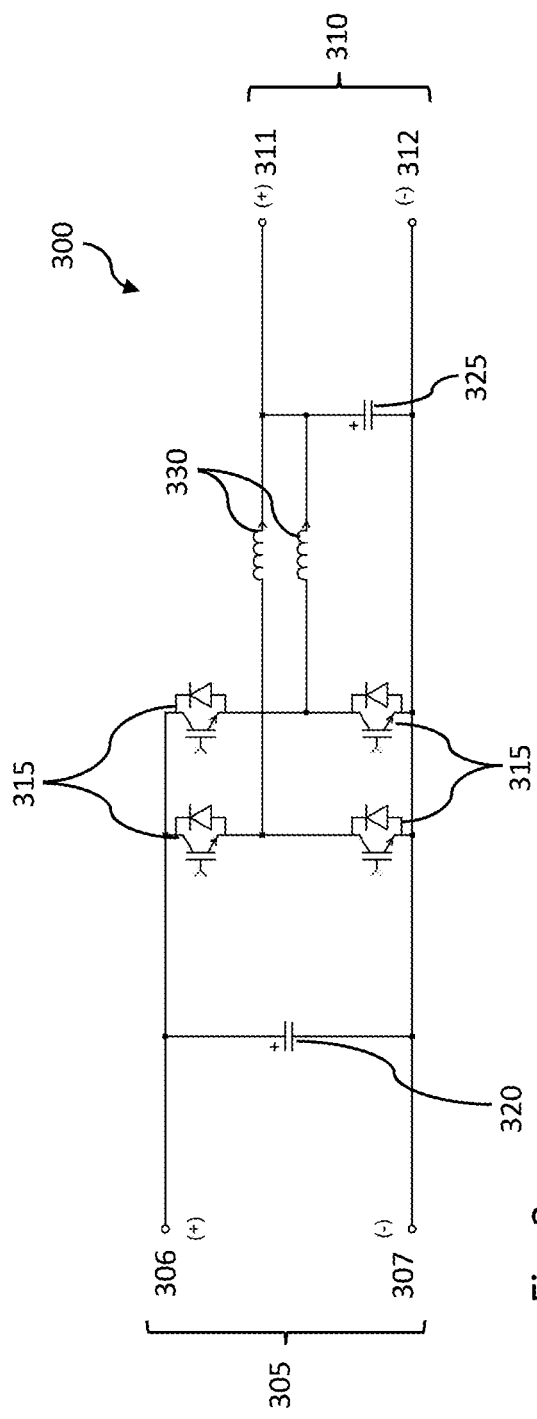
FIG. 3 is a circuit diagram of a bidirectional DC-to-DC power converter in accordance with an illustrative embodiment.

FIG. 3 is a circuit diagram of a bidirectional DC-to-DC power converter in accordance with an illustrative embodiment. The DC-to-DC power converter 300 includes input terminals 305, output terminals 310, switches 315, an input filtering element 320, and output filtering elements 325 and 330. In alternative embodiments, additional, fewer, and/or different elements can be used. For example, in alternative embodiments, any suitable filtering element(s) in any suitable arrangement may be used or no filtering element(s) may be used. The DC-to-DC power converter 300 can be used in place of the DC-to-DC converter 200. For example, if each of the switches 215 and the switches 315 have the same power limit, the DC-to-DC power converter 300 can handle twice the power as the DC-to-DC power converter 200. In another example, because the DC-to-DC power converter 300 includes twice the switching legs of the DC-to-DC power converter 200, the ripple on the output power can be reduced. However, in the DC-to-DC power converter 300, when connected to the AC-to-DC power converter 100, the output terminals 310 have a common-mode voltage because the negative output terminal 312 is electrically connected to the negative input DC bus terminal 307 (which is electrically connected to the output DC bus terminal 112).

Figure 4A:
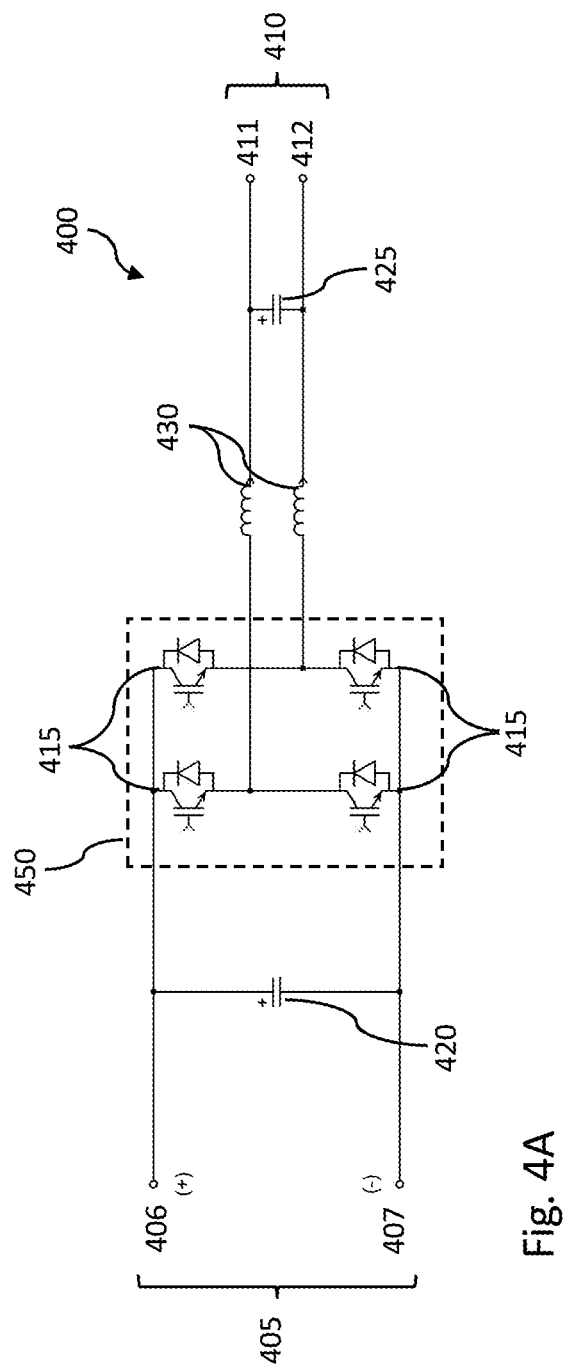
FIG. 4A is a circuit diagram of a bidirectional DC-to-DC power converter with a controllable DC offset in accordance with an illustrative embodiment.

FIG. 4A is a circuit diagram of a bidirectional DC-to-DC power converter with a controllable DC offset in accordance with an illustrative embodiment. The DC-to-DC power converter 400 includes input terminals 405, output terminals 410, switches 415, an input filtering element 420, and output filtering elements 425 and 430. In alternative embodiments, additional, fewer, and/or different elements can be used. For example, in alternative embodiments, any suitable filtering element(s) in any suitable arrangement may be used or no filtering element(s) may be used. Also, as mentioned above, the DC-to-DC power converter 400 can be unidirectional.

The DC-to-DC converter 400 includes a controllable DC offset. That is, when the input terminals 405 are electrically connected to the DC bus output terminals of an AC-to-DC converter (e.g., the AC-to-DC converter 100), the switches 415 can be operated to control the common mode voltage between the output terminals 410 and the input terminals 405, thereby also controlling the common-mode voltage between the output terminals 410 and the neutral of the input to the AC-to-DC converter. The "neutral" of the AC power (e.g., the input to the AC-to-DC converter) is the instantaneous average voltage of all three phases of the AC power (or two phases in embodiments in which the AC power includes only two phases). In some instances, the "neutral" of the AC power is an approximation of the instantaneous average voltage of all three phases of the AC power. As shown in FIG. 4A, the voltage between the positive output terminal 411 and the negative output terminal 412 can be controlled via the switches 415. For example, the voltage between the DC bus positive input terminal 406 and the positive output terminal 411 can be controlled via the switches 415, and the voltage between the DC bus negative input terminal 407 and the negative output terminal 412 can be controlled via the switches 415.

In an illustrative embodiment, the DC-to-DC power converter 400 is bidirectional and the terminals 110 can be referred to as "DC terminals." That is, the switches 415 can be operated to allow power to flow through the DC terminals in either direction. In some instances, the DC terminals can function as input terminals, and in some instances, the DC terminals can function as output terminals.

As noted above, the DC-to-DC converter 400 can be used to output a DC voltage that is less than the DC bus voltage. The switches 415 can be operated to control the amount that the output voltage is reduced. By increasing or decreasing the difference in duty cycles between the two legs, the boost ratio may be controlled. By adding or subtracting an arbitrary duty cycle from both legs simultaneously, the common-mode voltage between the input terminals 405 and the output terminals 410 may be controlled. In the maximum case, the switch 415 in the lower right of FIG. 5 may be locked into the 'ON' position, effectively reducing the circuit to the same as in FIG. 2. In this case, the negative output terminal 412 of and the negative input terminals 407 are at the same potential. Alternatively, the switch 415 in the upper left of FIG. 5 may be locked 'ON' such that the positive input terminal 406 and the positive output terminal 411 are at the same potential.

By modulating the switches 415 then, at an arbitrary duty cycle, it is possible to adjust the relative common-mode voltage between the input terminals 405 and the output terminals 410, from a minimum when the negative input terminal 405 and the negative output terminal 412 are at the same potential, to a maximum where the positive input terminal 406 and the positive output terminal 411 are at the same potential.

One difference between the DC-to-DC power converters 200 and 300 and the DC-to-DC power converter 400 (which has a controllable DC offset) is that the voltage of the negative output terminal 412 is controllable via the switches 415. That is, the negative output terminal 212 and the negative output terminal 312 are directly connected to the negative DC bus terminals 207 and 307, respectively. Thus, the voltage between the negative output terminal 212/the negative output terminal 312 and the ground (or the neutral of an input power source of an AC-to-DC power converter) cannot be controlled. Because the negative output terminal 412 of the DC-to-DC converter 400 is electrically connected to the DC bus negative terminal 407 through one of the switches 415, the voltage between the negative output terminal 412 and the DC bus negative terminal 407 can be controlled. Thus, the voltage between the ground and the negative output terminal 412 (and the voltage between the ground and the positive output terminal 411) can be controlled. As noted above, the term "ground" means a common electrical point. A "ground" may or may not be an earth ground, depending upon the embodiment.

Because the voltage between the ground (or any other suitable neutral) and the negative output terminal 412 can be controlled, the voltage can be controlled to be any suitable voltage. Thus, the output terminals 410 of multiple DC-to-DC power converters 400 can be connected in parallel (e.g., to a respective AC-to-DC power converter) can be controlled to have the same common mode voltage. Accordingly, the output terminals 410 of the multiple DC-to-DC power converters 400 can be connected to one another without creating a short circuit. For example, two DC-to-DC power converters 400 each connected to an AC-to-DC power converter can be used to provide twice the power to an electrical load than a single DC-to-DC power converter 400.

Because the voltage between the ground (or any other suitable neutral) and the negative output terminal 412 can be controlled, the voltage can be controlled to be 0 V. By controlling the voltage between the ground and the negative output terminal 412 to be 0 V, the negative output terminal 412 can be directly connected to a ground without causing a short circuit (e.g., of the common-mode voltage).

Figure 4C:
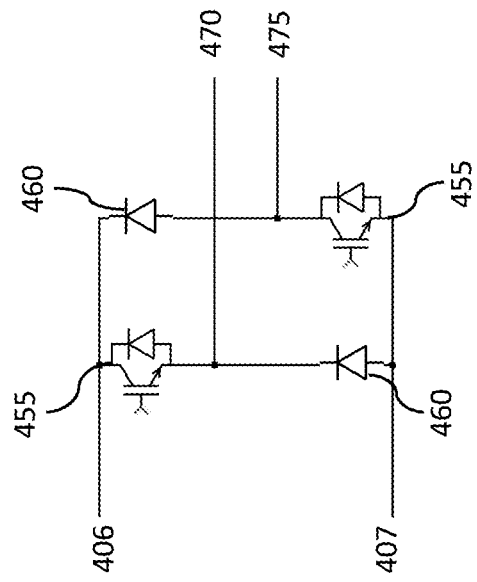
FIGS. 4B and 4C are alternative DC-to-DC power converter switching topologies in accordance with illustrative embodiments.
Figure 4B:
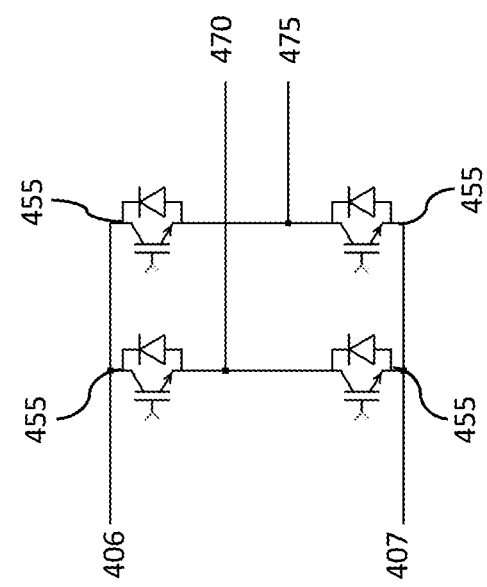

FIG. 4 is a circuit diagram of a bidirectional DC-to-DC power converter. However, in alternative embodiments, a unidirectional DC-to-DC power converter can be used. FIGS. 4B and 4C are alternative DC-to-DC power converter switching topologies in accordance with illustrative embodiments. The switch topology of FIG. 4B is also shown in FIG. 4A within dashed box 450. The switching topology shown in FIG. 4B is a bidirectional topology because the switches 455 can be operated such that electrical power flows from the DC bus terminals 406 and 407 to the terminals 470 and 475 or the switches 455 can be operated such that electrical power flows from the terminals 470 and 475 to the DC bus terminals 406 and 407. Each switch 455 can selectively open or close the conductivity through the switch 455.

In alternative embodiments, the switch topology of FIG. 4C can be used in place of the topology shown in FIG. 4B. The topology shown in FIG. 4C includes two switches 455 and two diodes 460 to allow power to flow from the DC bus terminals 406 and 407 to the terminals 470 and 475. However, in the topology of FIG. 4C, the switches 455 cannot be operated such that power flows from the terminals 470 and 475. Thus, the topology of FIG. 4C is a unidirectional topology. In alternative embodiments, the switches 455 in FIG. 4C can be replaced with diodes and the diodes 460 can be replaced with switches such that power can flow from the terminals 470 and 475 to the DC bus terminals 406 and 407.

In each of the topologies of FIGS. 4B and 4C, both of the terminals 470 and 475 are connected to the DC bus terminals 406 and 407 through switches. For example, the terminal 475 can be a negative output terminal. In each of the topologies of FIGS. 4B and 4C, one of the switches 455 (i.e., the switch 455 in the bottom right of FIGS. 4B and 4C) can be selectively operated to connect or disconnect the negative output terminal 475 to the negative DC bus terminal 407. Thus, the voltage between the negative output terminal 475 and the negative DC bus terminal 407 and, therefore, the voltage between the negative output terminal 475 and a ground or common point can be controlled.

Figure 5:
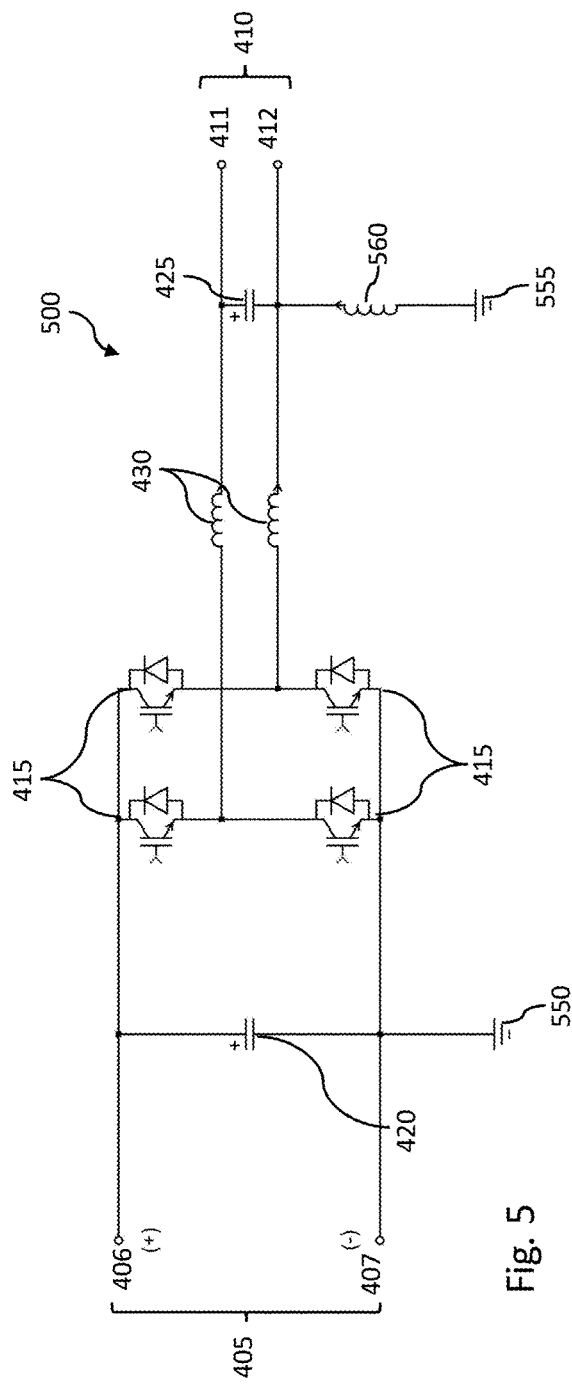
FIGS. 5-7 are circuit diagrams of bidirectional DC-to-DC power converters with a controllable DC offset in accordance with illustrative embodiments.

FIG. 5 is a circuit diagram of a bidirectional DC-to-DC power converter with a controllable DC offset in accordance with an illustrative embodiment. The DC-to-DC power converter 500 is the same as the DC-to-DC power converter 400 that shows common points 550 and 555. As shown in FIG. 5, the negative output terminal 412 can be connected to the common point 555 and the DC bus negative terminal 407 can be connected to the common point 550. The common points 550 and 555 can be electrically connected to be the same (or similar) voltage potential. For example, a common point (e.g. the common point 550) can be a ground. As shown in FIG. 5, the negative output terminal 412 can be connected through a filtering element 560. The filtering element 560 is an inductor. In alternative embodiments, any suitable filtering element(s) or no filtering element may be used.

The modulation of both the AC-to-DC power converter (such as the AC-to-DC power converter 100) as well as the DC-to-DC converter 500 may be controlled simultaneously to achieve nearly any combination of DC offsets between the AC input and the DC output. This can be useful, for example, to (1) cancel low frequency common mode voltages at the DC output terminals, (2) apply intentional signals to the DC terminals with reference to another potential (e.g. negative DC terminal to ground), or (3) derive an additional AC or DC voltage from the DC high to ground (or other reference) or from the DC low to ground (or other reference).

Figure 6:
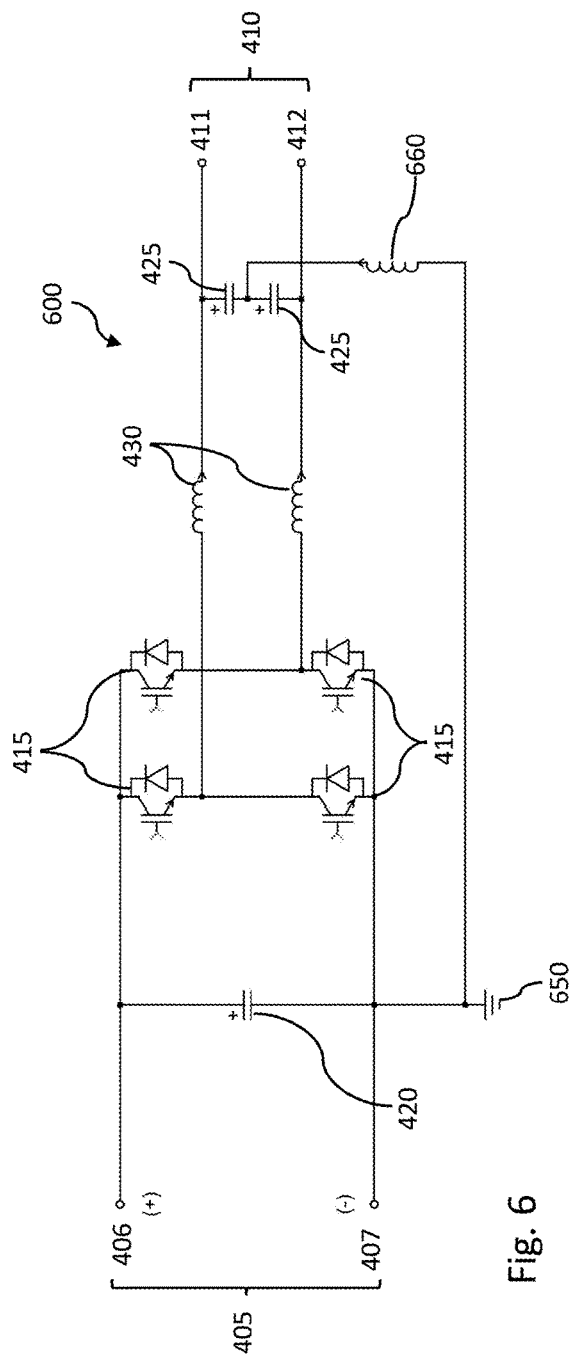

FIG. 6 is a circuit diagram of a bidirectional DC-to-DC power converter with a controllable DC offset in accordance with an illustrative embodiment. The DC-to-DC power converter 600 is the same as the DC-to-DC power converter 400 with the common point 650 and the filtering element 660. In the embodiment shown in FIG. 6, the output terminals 410 can be connected directly to the DC bus negative terminal 407 via the filtering element 660. Between the two output terminals 410 are two filtering elements 425 (e.g., capacitors) connected in serial. Between the two filtering elements 425 is the connection to the common point 650. In such an embodiment, a current (e.g., a common-mode current) flowing through the filtering element 660 can be split between the two switching legs. In alternative embodiments, any suitable filtering element(s) or no filtering element may be used.

In an illustrative embodiment, a first DC load can be connected between the output terminals 410 of the DC-to-DC converter 600, and a second DC load can be connected between one of the output terminals 410 and ground or other common point. For example, the positive terminal of a battery can be connected to the positive output terminal 411 and the negative terminal of the battery can be connected to the negative output terminal 412. In the same embodiment, a second DC load (or source) can be connected between the positive output terminal 411 and the common point 650.

For example, the switching of the switches 415 can be operated to selectively charge or discharge the battery while simultaneously providing power to the DC load connected across the output terminals 410. In such an example, the battery can be a 100 V battery connected between the positive output terminal 411 and the common point 650. The voltage between the output terminals 410 can be 200 V and connected to a DC load (e.g., a motor). When the battery is to be charged, the common-mode voltage of the output terminals 410 can be adjusted via the operation of the switches 415 such that the voltage between the positive output terminal 411 and the common point 650 is, for example, 110 V and the voltage between the common point 650 and the negative output terminal 412 is 90 V. Similarly, when the battery is to be discharged, the common-mode voltage of the output terminals 410 can be adjusted such that the voltage between the positive output terminal 411 and the common point 650 is, for example, 90 V, and the voltage between the common point 650 and the negative output terminal 412 is 110 V. Whether the battery is charging or discharging, the voltage between the output terminals 410 is 200 V. Thus the DC load connected to the output terminals 410 is uninterrupted.

In some embodiments, a first DC load (or source) can be connected between a first output terminal and neutral and a second DC load (or source) can be connected between a second output terminal and neutral. Referring, for example, to the embodiment shown in FIG. 6, a first battery can be connected between the output terminal 411 and the common point 650 and a second battery can be connected between the output terminal 412 and the common point 650. Thus, the two DC switching legs shown in FIG. 6 can each be used to provide power to a respective DC load. In alternative embodiments, any suitable number of DC switching legs can be used. For example, a DC-to-DC converter can include only one switching leg that provides power to a DC load connected between an output terminal and a neutral. In another example, three DC switching legs can be used that each provide power to a respective DC load. In other examples, the DC-to-DC converter can include four, five, six, etc. DC switching legs.

Figure 7:
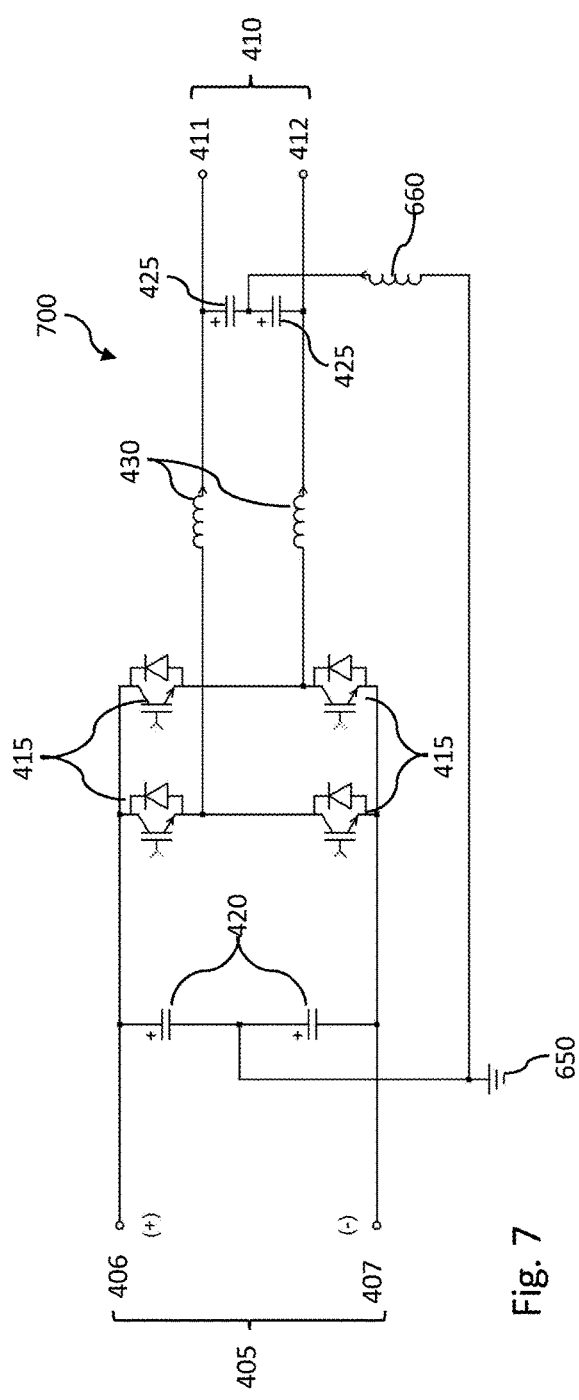

FIG. 7 is a circuit diagram of a bidirectional DC-to-DC power converter with a controllable DC offset in accordance with an illustrative embodiment. The DC-to-DC power converter 700 is similar to the DC-to-DC power converter 600 and includes a grounding of the DC bus terminals 405. In the embodiment shown in FIG. 7, between the DC bus terminals 405 are two filtering elements 420 (e.g., capacitors) connected in series with one another. The common point 650 is connected between the two filtering elements 420. In an illustrative embodiment, such a configuration allows a current flowing through the filtering element 660 to be split between the two DC bus terminals. In alternative embodiments, any suitable filtering element(s) or no filtering element may be used.

Figure 8:
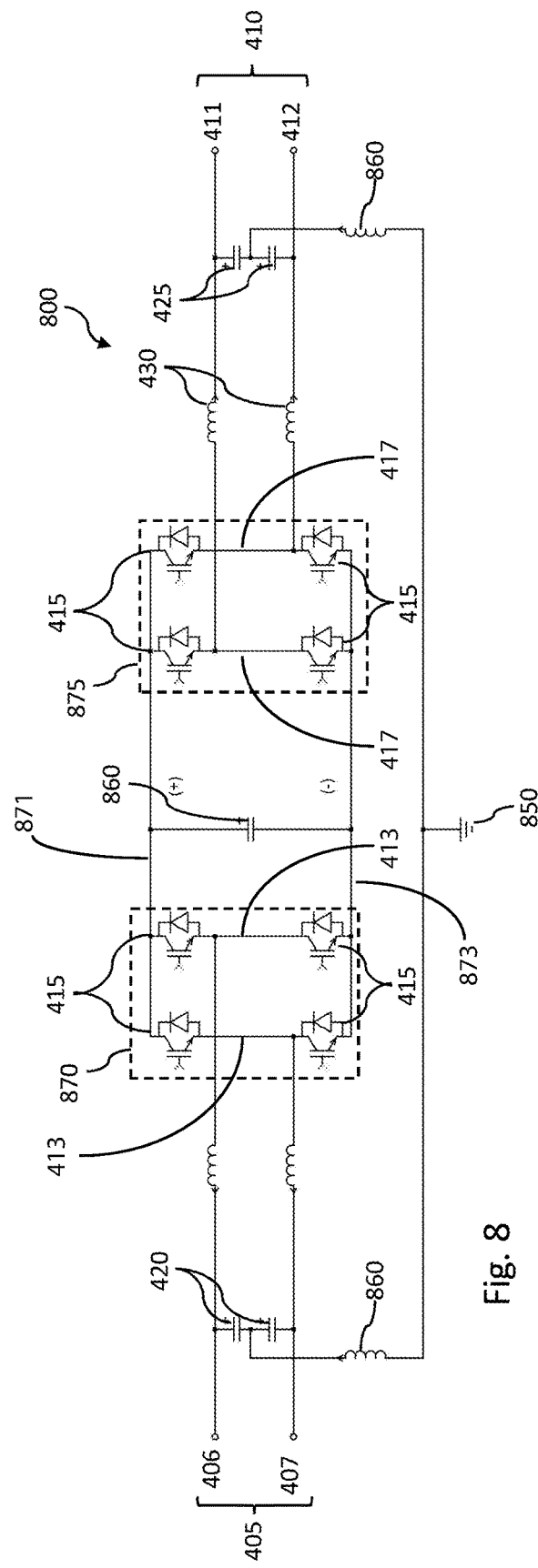
FIGS. 8-10 are circuit diagrams of bidirectional DC-to-DC power converters with a controllable DC offset in accordance with illustrative embodiments.

FIG. 8 is a circuit diagram of a bidirectional DC-to-DC power converter with a controllable DC offset in accordance with an illustrative embodiment. The DC-to-DC power converter 800 includes an input switch bank 870 and an output switch bank 875. The DC bus terminals 405 and the output terminals 410 can be connected to the common point 850 through the filtering elements 860 (e.g., inductors). In the embodiment shown in FIG. 8, the filtering elements 420 (e.g., capacitors) are connected in series with one another between the DC bus terminals 405. The common point 850 is connected between the filtering elements 420. Similarly, filtering elements 425 (e.g., capacitors) are connected in series with one another between the output terminals 410, and the common point 850 is connected between the filtering elements 425. In alternative embodiments, any suitable filtering element(s) or no filtering element may be used. More specifically, the DC-to-DC power converter 800 includes the input switch bank 870 and the output switch bank 875. The input switch bank 870 includes two switching legs 413. Each of the switching legs 413 of the input switch bank 870 is electrically connected across a positive secondary DC bus terminal 871 and a negative secondary DC bus terminal 873. Further, the two switching legs 413 of the input switch bank 870 each include two switches 415 in series. The output switch bank 875 includes two switching legs 417 electrically connected across the positive secondary DC bus terminal 871 and the negative secondary DC bus terminal 873. The two switching legs 417 of the output switch bank 875 each include two switches 415 in series. The positive input terminal 406 and the negative input terminal 407 each electrically connect to a respective one of the two switching legs 413 of the input switch bank 870. The positive output terminal 411 and the negative output terminal 412 each connect to a respective one of the two switching legs 417 of the output switch bank 875.

Figure 9:
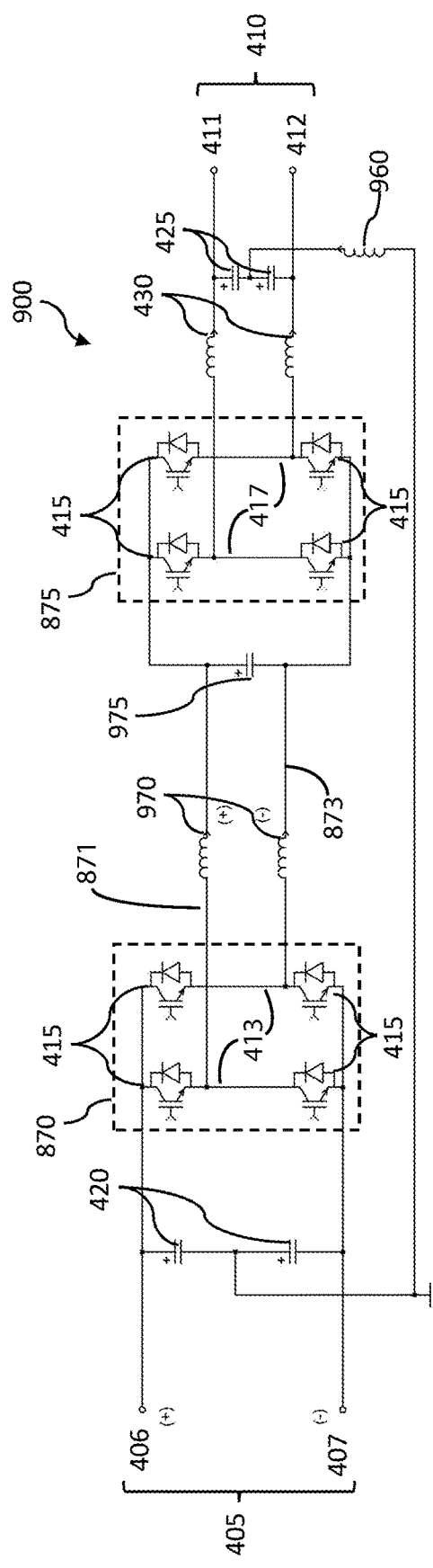

FIG. 9 is a circuit diagram of a bidirectional DC-to-DC power converter with a controllable DC offset in accordance with an illustrative embodiment. In the DC-to-DC power converter 900, each leg of the input switch bank 870 is connected to opposing sides of the filtering element 975 (e.g., a capacitor). Each of the legs of the input switch bank 870 include one of the filtering elements 970 (e.g., inductors). The output switch bank 875 is connected to opposing sides of the filtering element 975, as shown in FIG. 9. More specifically, the DC-to-DC power converter 900 includes the input switch bank 870 and the output switch bank 875. The input switch bank 870 includes two switching legs 413 electrically connected across the positive input terminal 406 and the negative input terminal 407. Each of the switching legs 413 of the input switch bank 870 includes two switches 415 in series. The output switch bank 875 includes two switching legs 417 electrically connected across the positive secondary DC bus terminal 871 and the negative secondary DC bus terminal 873. Each of the two switching legs 417 of the output switch bank 875 includes two switches 415 in series. Further, the positive secondary DC bus terminal 871 and the negative secondary DC bus terminal 873 are each electrically connected to a respective one of the two switching legs 413 of the input switch bank 870, and each of the positive output terminal 411 and the negative output terminal 412 connect to a respective one of the two switching legs 417 of the output switch bank 875.

Figure 10:
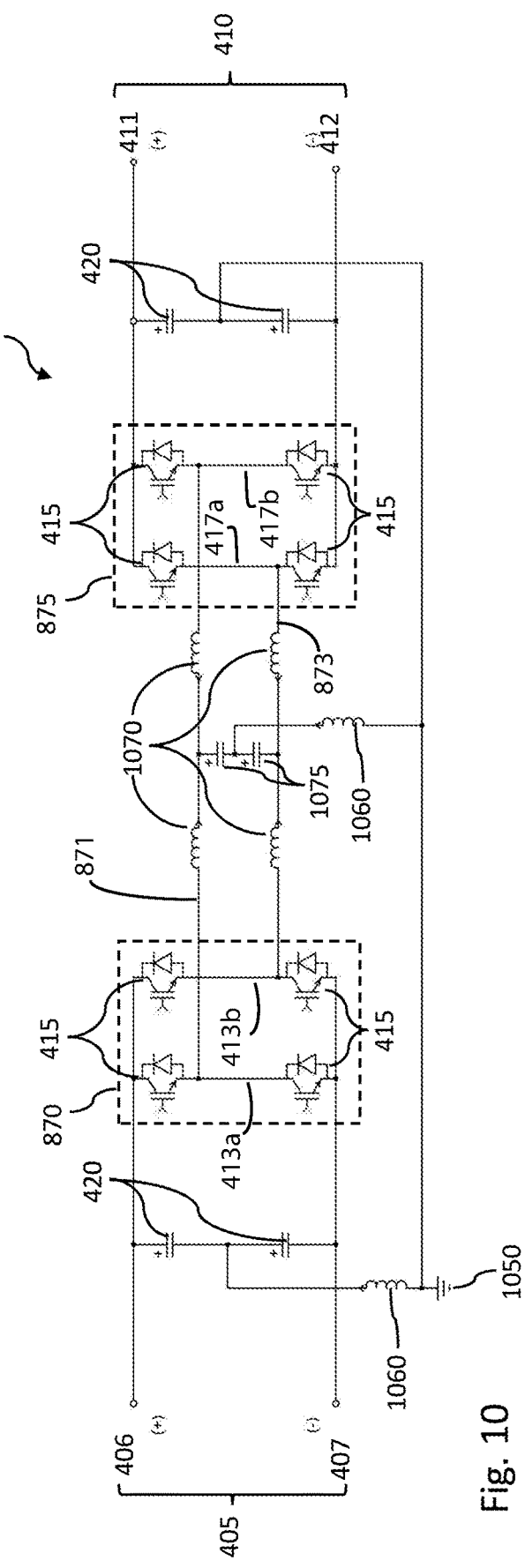

FIG. 10 is a circuit diagram of a bidirectional DC-to-DC power converter with a controllable DC offset in accordance with an illustrative embodiment. In the DC-to-DC power converter 1000, each leg of the input switch bank 870 is connected to a respective leg of the output switch bank 875. Each connection between the legs of the input switch bank 870 and the output switch bank 875 include filtering elements 1070 (e.g., inductors). Between the connections between the legs of the input switch bank 870 and the output switch bank 875 are filtering elements 1075 (e.g., capacitors). The embodiment shown in FIG. 10 includes two filtering elements 1065. Between the two filtering elements 1065 is a connection to the common point 1050 through the filtering element 1060. More specifically, the DC-to-DC power converter 1000 includes the input switch bank 870 and the output switch bank 875. The input switch bank 870 includes a first switching leg 413a and a second switching leg 413b. Each of the first switching leg 413a and the second switching leg 413b is electrically connected across the positive input terminal 406 and the negative input terminal 407. The first switching leg 413a and the second switching leg 413b each include two switches 415 in series. The output switch bank 875 includes a third switching leg 417a and a fourth switching leg 417b. Each of the third switching leg 417a and the fourth switching leg 417b is electrically connected across the positive output terminal 411 and the negative output terminal 412. The third switching leg 417a and the fourth switching leg 417b each include two switches 415 in series. Further, the first switching leg 413a is electrically connected to the fourth switching leg 417b via the positive secondary DC bus terminal 871, and the second switching leg 413b is electrically connected to the third switching leg 417c via the negative secondary DC bus terminal 873.

FIGS. 8-10 illustrate various embodiments of DC-to-DC power converters with cascaded switching banks (i.e., the switching banks 870 and 857). Using cascaded switching banks can allow greater common-mode voltages than DC-to-DC power converters without cascaded switching banks. For example, the switching bank 870 can be used to create a first common-mode voltage offset between the input terminals 405 and the voltage across a DC bus filtering element (e.g., the filtering elements 860, 965, or 1065) and ground or other common reference point. The switching bank 875 can similarly be used to create a second common-mode voltage offset between the output terminals 410 and the ground. Thus, the difference between the common-mode voltage offset of the output terminals 410 and ground can be the first common-mode voltage and the second common-mode voltage when compared to the common-mode voltage of the input terminals 405 and ground.

In an illustrative embodiment, the voltage across the input terminals 405 is the same as the voltage across the DC bus filtering element and across the output terminals 410. Thus, although the same voltage is across the input terminals 405, the DC bus filtering element (e.g., the filtering elements 860, 965, or 1065), and the output terminals 410, the common-mode voltage between the DC bus filtering element and ground is greater than the common-mode voltage between the input terminals 405 and ground. Similarly, the common-mode voltage between the output terminals 410 and ground is greater than the common-mode voltage between the DC filtering element and ground.

Although FIGS. 8-10 show two cascaded DC switching banks, in alternative embodiments, any suitable number of cascaded switching banks can be used to create any suitable common-mode voltage between the output terminals 410 and ground. For example, the more cascaded switching banks that are used, the higher the possible common-mode voltage can be between the output terminals 410 and ground.

Figure 11:
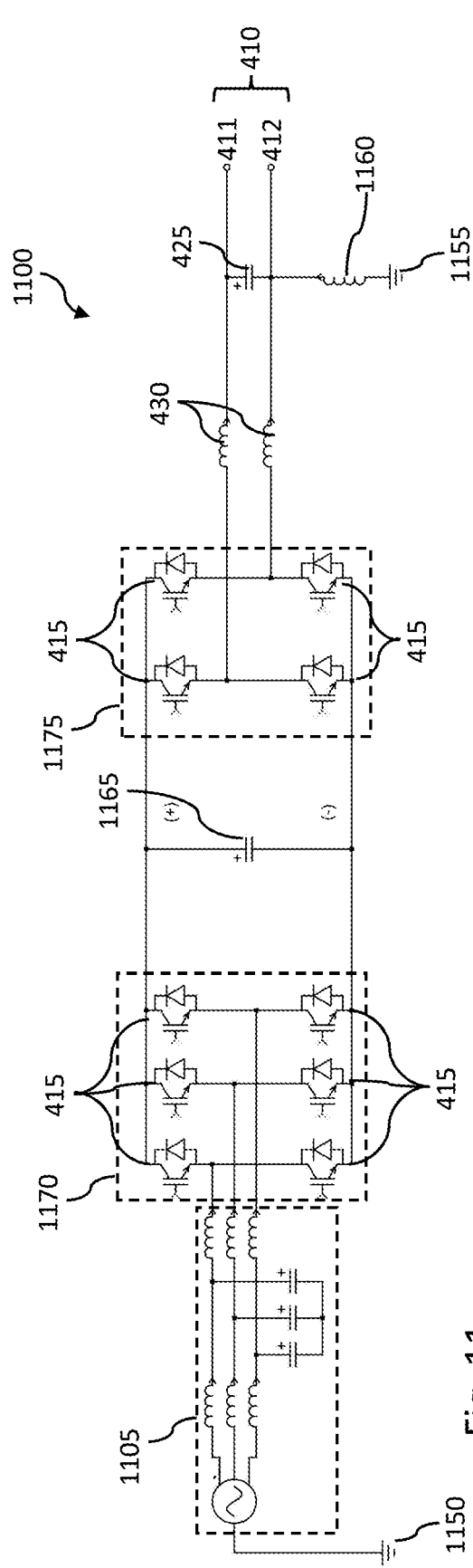

FIG. 11 is a circuit diagram of an AC-to-DC power converter with a controllable DC offset in accordance with an illustrative embodiment. The AC-to-DC power converter 1100 includes an AC power source 1105, an AC-to-DC power converter 1170 with switches 415, a filtering element 1165, and a DC-to-DC power converter 1175 with switches 415. In alternative embodiments, additional, fewer, and/or different elements may be used. For example, in alternative embodiments, any suitable filtering element(s) in any suitable arrangement may be used or no filtering element(s) may be used.

In an illustrative embodiment, the AC-to-DC power converter 1100 connects the AC-to-DC power converter 100 of FIG. 1 and the DC-to-DC power converter 400 of FIG. 4A across the DC bus (e.g., across the filtering element 1165). In alternative embodiments, any suitable number of AC-to-DC power converters and any suitable DC-to-DC power converters can be connected to the DC bus. For example, an illustrative circuit can include one AC power source 1105, one AC-to-DC power converter 1170, and multiple DC-to-DC power converters 1175 that are each connected to the DC bus across the filtering element 1165. In another example, an illustrative embodiment includes one or more AC power sources 1105, multiple AC-to-DC power converters 1175 that are each connected to the DC bus, and one or more DC-to-DC power converters 1175 that are each connected to the DC bus. In some embodiments, the output terminals 410 corresponding to each of the DC-to-DC power converters 1175 can be connected to a single DC load. In an alternative embodiment, each of the output terminals 410 corresponding to each of the DC-to-DC power converters 1175 can be connected to a respective DC load.

In the embodiment shown in FIG. 11, the AC power source 1105 provides three-phase AC power to the AC-to-DC power converter 1170. The switches 415 of the AC-to-DC power converter 1170 are operated to provide DC voltage across the filtering element 1165 (e.g., a capacitor). The DC voltage across the filtering element 1165 is the DC bus. In an illustrative embodiment, the top rail of FIG. 11 is the positive DC bus terminal and the bottom rail is the negative DC bus terminal. The DC power output by the AC-to-DC power converter 1170 can be a DC bus. The DC power output by the AC-to-DC power converter 1170 can be an input to the DC-to-DC power converter 1175. As shown in FIG. 11, the neutral of the AC power supply 1105 and the negative output terminal 412 can both be electrically connected to each other via the common point 1150 and the common point 1155. The common point 1150 and the common point 1155 may be electrically connected. For example, the common point 1150 and the common point 1155 can both be a ground. In alternative embodiments, any suitable filtering element(s) in any suitable arrangement may be used or no filtering element(s) may be used.

Figure 12:
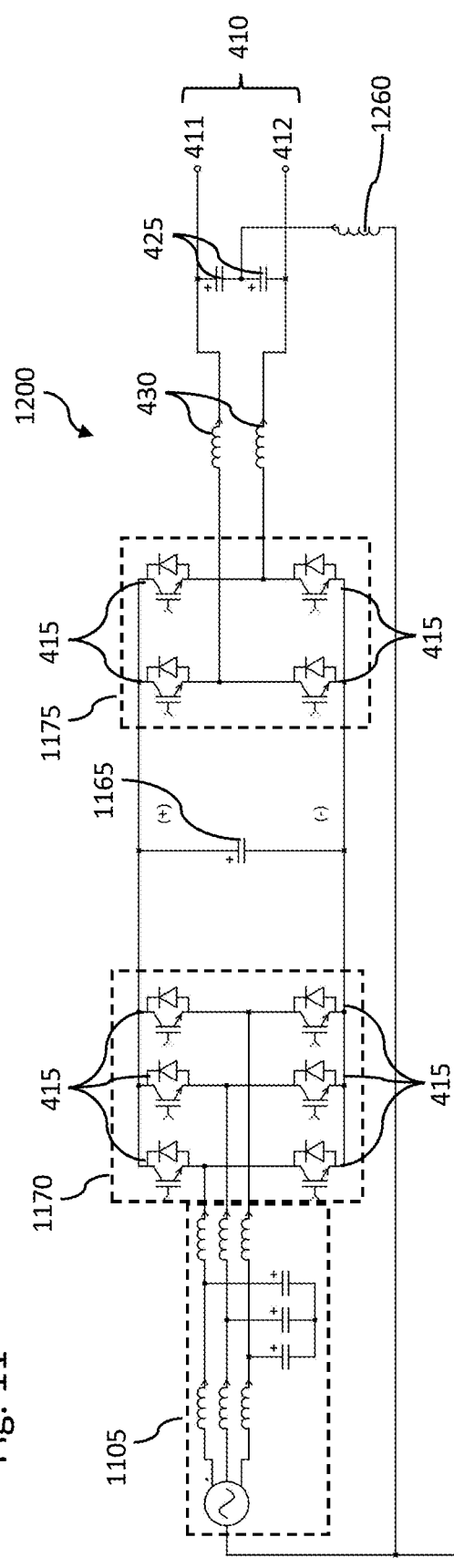

FIG. 12 is a circuit diagram of an AC-to-DC power converter with a controllable DC offset in accordance with an illustrative embodiment. The AC-to-DC power converter 1200 operates in the same manner as the AC-to-DC power converter 1100. The output terminals 410 are connected to the common point 1250 via the filtering elements 425. In the embodiment illustrated in FIG. 12, the neutral of the AC power source is connected to the common point 1250. In alternative embodiments, any suitable filtering element(s) in any suitable arrangement may be used or no filtering element(s) may be used.

FIG. 13 is a circuit diagram of an AC-to-DC power converter with a controllable DC offset in accordance with an illustrative embodiment. The AC-to-DC power converter 1300 includes an AC power source 1105, an AC-to-DC power converter 1170, and a DC-to-DC power converter 1175. The output terminals of the AC-to-DC power converter 1170 are each connected to one of the switching legs of the DC-to-DC power converter 1175. The AC-to-DC power converter 1170 includes two "switching legs" that each include two switches 415 connected in series. Each of the switching legs is connected between the output terminals 410. The neutral of the AC power supply 1105 is connected to the common point 1250. In alternative embodiments, any suitable filtering element(s) in any suitable arrangement may be used or no filtering element(s) may be used.

As shown in FIGS. 11-13, the connections between the DC-to-DC power converter 1175 and the DC bus are different for the AC-to-DC power converters 1100/1200 and the AC-to-DC power converter 1300. The topology of the AC-to-DC power converters 1100 and 1200 allow the voltage across the output terminals 410 to be lower than the voltage across the DC bus. The topology of the AC-to-DC power converter 1300 allows the voltage across the output terminals 410 to be higher than the voltage across the DC bus.

FIG. 14 is a circuit diagram of an AC-to-DC power converter with a controllable DC offset in accordance with an illustrative embodiment. The AC-to-DC power converter 1400 is similar to the AC-to-DC power converter 1200 except that the neutral of the AC power source 1105 is electrically connected to a leg of the AC-to-DC power converter 1170. In the embodiment illustrated in FIG. 14, the AC-to-DC power converter 1400 includes a common-mode inductor 1405. The common-mode inductor 1405 can be any suitable common-mode inductor that resists common-mode current. By using a common-mode inductor 1405, the other filtering elements (e.g., the inductive filtering elements 430) can be smaller and/or less expensive because they do not need to be designed to limit the common-mode current. Instead, the common-mode inductor 1405 limits the common-mode current traveling through the AC-to-DC power converter 1400. In some embodiments, any other suitable power converter can include a common-mode inductor, such as the embodiments illustrated in FIGS. 4A and 5-13. In some embodiments, the common-mode inductor 1405 may not be present.

As shown in FIG. 14, each phase of the AC power source 1105 is connected to the neutral of the AC power source 1105 via a capacitor. The output terminals 410 are also connected to the neutral of the AC power source 1105 via a capacitor. The neutral of the AC power source is also connected to the common point 1450. In some embodiments, the common point 1450 can be a ground. In alternative embodiments, the common point 1450 may not be grounded to the ground of another electrical circuit. In alternative embodiments of any suitable power converter described herein (e.g., those corresponding to FIGS. 11-13), the output terminals 410 can be directly connected to each of the phases of the AC power source 1105 via one or more capacitors, similar to the topology shown in FIG. 14.

Figure 15:
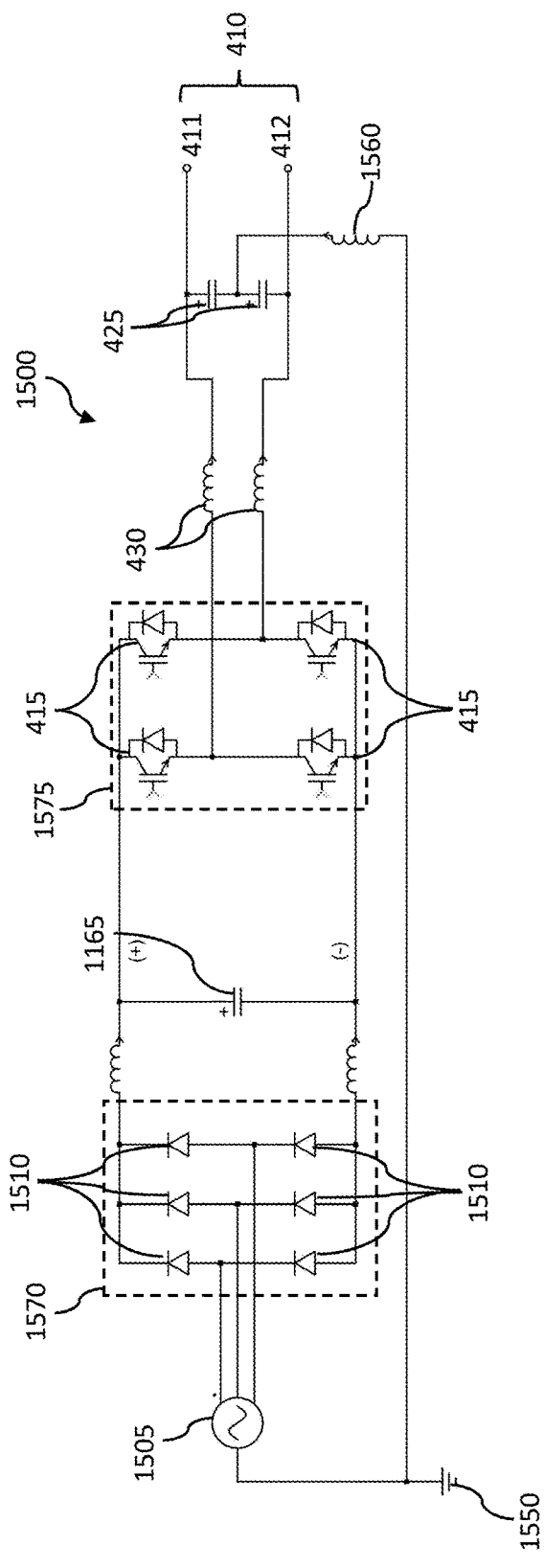

FIG. 15 is a circuit diagram of an AC-to-DC power converter with a controllable DC offset in accordance with an illustrative embodiment. The AC-to-DC power converter 1500 is similar to the AC-to-DC power converter 1200, except that the AC-to-DC power converter 1570 is passive. The AC-to-DC power converter 1570 includes diodes 1510 that rectify the AC power from the AC power source 1505. In alternative embodiments, any suitable filtering element(s) in any suitable arrangement may be used or no filtering element(s) may be used.

In an illustrative embodiment, one or more sensors can be used to control the switches 415. For example, a current sensor on a ground connection can be monitored and the offset command to the output terminals 410 can be adjusted to reduce the amount of current flowing through the ground connection in the event of a fault or for any other suitable purpose. The DC offset of a DC-to-DC power converter may be actively adjusted to maintain the lowest possible current to the ground based on the current sensed by the current sensor. Such an example can effectively emulate a transformer-isolated system in which ground faults on the DC output of the DC-to-DC power converter can be tolerated without excessive current flowing or personnel/equipment hazards being generated.

For example, referring to FIG. 14, one or more current sensors can be configured to monitor a common-mode current at the output terminals 410. If there is a common-mode current that is above a pre-determined threshold, the DC offset of the output terminals 410 can be adjusted so that 410 or 411 is set to 0 V. For example, the common point 1450 can be connected to a ground. If a person creates a short-circuit between the positive output terminal 411 and the common point 1450 (e.g., through their body), then there will be a common-mode current flowing out of 410. This can be detected by a common-mode current sensor that is set to a pre-determined threshold, such as 600 milli-Amperes (mA). In response to determining that the common-mode current through the output terminals 410 is greater than the threshold, the voltage between the positive output terminal 411 and the ground can be reduced to 0 V by adding an offset command. However, the voltage between the output terminals 410 can remain constant. Thus, even in the event of an accident, the power converter system can remain functional. Although such an example is made in reference to the embodiment shown in FIG. 14, any other suitable embodiment may include such current sensors.

Figure 16A:
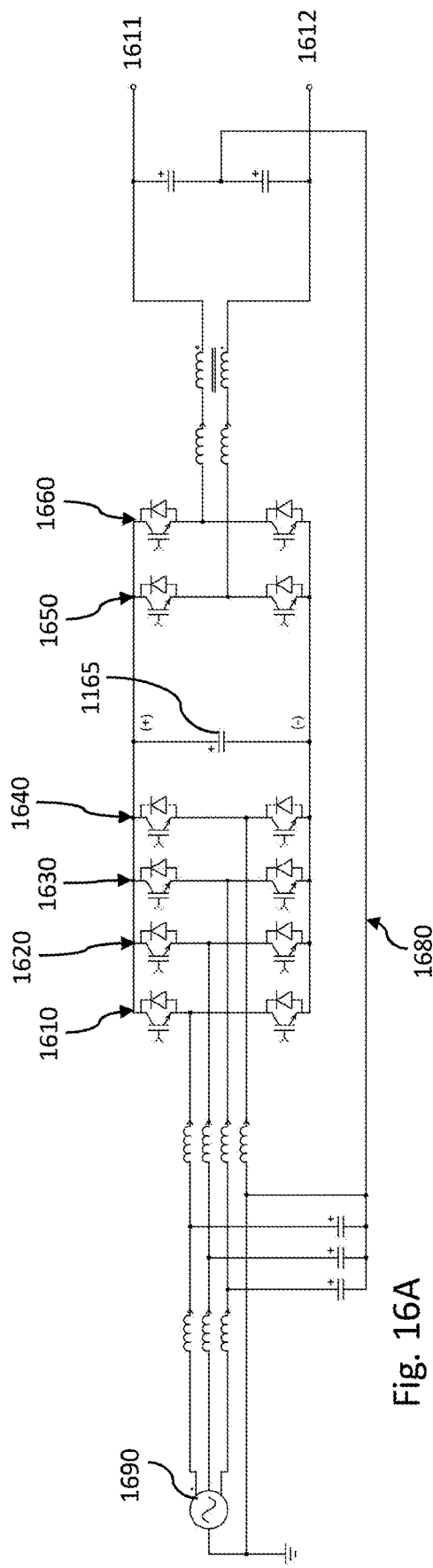
FIG. 16A is a bidirectional AC-to-DC power converter with a controllable DC offset in accordance with an illustrative embodiment.

FIG. 16A is a bidirectional AC-to-DC power converter with a controllable DC offset in accordance with an illustrative embodiment. The AC-to-DC power converter 1600 is similar to the AC-to-DC power converter 1400. The AC-to-DC power converter 1600 includes switching legs 1610, 1620, 1630, 1640, 1650, and 1660. As shown in FIG. 16A, each of the switching legs 1610, 1620, 1630, 1640, 1650, and 1660 include a top switch that selectively connects a respective phase to the positive DC bus and a bottom switch that selectively connects the respective phase to the negative DC bus. Each of switching legs 1610, 1620, and 1630 are connected to one of the AC phases of the AC source 1690. The switching leg 1640 is connected to the neutral of the AC source 1690. The switching legs 1650 and 1660 are connected to the DC terminals 1612 and 1611, respectively.

In some instances, a common-mode current flows through the AC-to-DC power converter 1600. For example, the common-mode current can flow through the common connection 1680. Conceptually, the common-mode current can flow alternatingly from left to right or right to left in the common connection 1680 of FIG. 16A. In the example in which the common-mode current flows from left to right, the common-mode current can split and pass through each of the capacitors connected to the DC terminals 1611 and 1612 and flow through each of the switching legs 1660 and 1650. In some instances, the common-mode current through each of the switching legs 1660 and 1650 is equal. In other instances, more common-mode current can flow through the switching leg 1660 than through the switching leg 1650 (or vice versa). The split common-mode current can flow through each of the positive DC bus terminal (i.e., the top rail of the AC-to-DC power converter 1600) and the negative DC bus terminal (i.e., the bottom rail of the AC-to-DC power converter 1600) and re-join through the switching legs 1610, 1620, 1630, and 1640.

In an illustrative embodiment, the switches of the switching legs 1610, 1620, 1630, 1640, 1650, and 1660 are synchronized to reduce the amount of common-mode current through the AC-to-DC power converter 1600. FIGS. 16B-16E are graphs that show switching states in accordance with an illustrative embodiment. FIGS. 16B and 16C correspond to the AC-side switching legs 1610, 1620, 1630, and 1640. FIGS. 16D and 16E correspond to the DC-side switching legs 1650 and 1660.

FIG. 16B is a graph of AC reference voltages and a triangle carrier over time. The sine waves 1601, 1602, and 1603 each correspond to the voltage over time of one of the three phases of the AC source 1690. More specifically, the sine wave 1601 corresponds to the voltage of the phase connected to the switching leg 1610, the sine wave 1602 corresponds to the voltage of the phase connected to the switching leg 1620, and the sine wave 1603 corresponds to the voltage of the phase connected to the switching leg 1630. The neutral line 1604 corresponds to the voltage of the neutral over time (e.g., the average of the sine waves 1601, 1602, and 1603).

The triangle carrier 1607 is used to illustrate what state the switching legs 1610, 1620, 1630, and 1640 are in over time. Although the triangle carrier 1607 is a triangle wave, in alternative embodiments any suitable waveform can be used. Also, the relative frequency of the triangle carrier 1607 to the frequency of the sine waves 1601, 1602, and 1603 is arbitrarily chosen for purposes of illustration. In alternative embodiments, any suitable frequency for the triangle carrier 1607 can be used. For example, the frequency of the triangle carrier 1607 can be higher than is shown in FIG. 16B (and in FIG. 16D).

FIG. 16C shows the switching states of the switching legs 1610, 1620, 1630, and 1640 over time. Each of the lines in FIG. 16C are in either a high state or a low state over time. During the high state, the top switch of the corresponding switching leg is in an ON state (e.g., open), and the bottom switch of the corresponding switching leg is in an OFF state (e.g., closed). During the low state, the top switch of the corresponding switching leg is in the OFF state, and the bottom switch of the corresponding switching leg is in the ON state. For example, when the line of FIG. 16C corresponding to the switching leg 1610 is high, the top switch of the switching leg 1610 is in the ON state, and the bottom switch is in the OFF state. Similarly, when the line corresponding to the switching leg 1610 is low, the top switch of the switching leg 1610 is in the OFF state, and the bottom switch is in the ON state.

Whether a line in FIG. 16C is high or low can be determined by referring to FIG. 16B. For example, when the sine wave 1601 is above the triangle carrier 1607 at any given time in FIG. 16B, the line of FIG. 16C corresponding to the switching leg 1610 is high. When the sine wave 1601 is below the triangle carrier 1607 at any given time in FIG. 16B, the line of FIG. 16C corresponding to the switching leg 1610 is low. The same principle applies to the sine wave 1602 and the switching leg 1620, the sine wave 1603 and the switching leg 1630, and the neutral line 1604 and the switching leg 1640.

The principles discussed above with respect to the AC switching legs 1610, 1620, 1630, and 1640 and the FIGS. 16B and 16C also apply to the DC switching legs 1650 and 1660 and the FIGS. 16D and 16E. FIG. 16D is a graph of the DC reference voltages 1605 and 1606 and the triangle carrier 1607 over time. FIG. 16D is a graph of the switching states of the switching legs 1650 and 1660 over time. The DC reference voltage 1605 corresponds to the average DC voltage of the DC terminal 1611, and the DC reference voltage 1606 corresponds to the average DC voltage of the DC terminal 1612 with respect to each other and the other phases that share a common DC voltage from the capacitive filtering element 1165.

When the DC reference voltage 1605 is above the triangle carrier 1607 in FIG. 16D, the line corresponding to the switching state of the switching leg 1650 is high, and when the DC reference voltage 1605 is below the triangle carrier 1607, the line corresponding to the switching state of the switching leg 1650 is low. Similarly, when the DC reference voltage 1606 is above the triangle carrier 1607, the line corresponding to the switching state of the switching leg 1660 is high, and when the DC reference voltage 1606 is below the triangle carrier 1607, the line corresponding to the switching state of the switching leg 1660 is low. When the line corresponding to the switching state of the switching leg 1650 is high, the top switch of the switching leg 1560 in FIG. 16A is in the ON state and the bottom switch of the switching leg 1650 is in the OFF state. Similarly, when the line corresponding to the switching state of the switching leg 1650 is low, the top switch of the switching leg 1560 is in the OFF state and the bottom switch of the switching leg 1650 is in the ON state. The same principle applies to the switching leg 1660.

As mentioned above, in some instances it is advantageous to synchronize the modulation of the AC switching legs 1610, 1620, 1630, and 1640 with the DC switching legs 1650 and 1660. Synchronization of the AC and DC switching legs can limit the common-mode current at the switching frequency, which circulates within the power converter during operation. High-frequency common-mode current reduction improves efficiency by reducing losses and allowing the use of smaller and/or less expensive filtering components. For example, in FIG. 16A, the AC switching legs 1610, 1620, 1630, and 1640 may be have their modulation pattern coordinated with the DC switching legs 1650 and 1660, as shown in FIGS. 16B-16E. FIGS. 16B-16E illustrate a possible coordination of such switching in accordance with an illustrative embodiment. In such an embodiment, center aligned sine-triangle modulation is shown. In alternative embodiments, any suitable modulation technique may be used, including edge aligned, etc. As shown by vertical lines 1609, the triangle carrier 1607 of both FIGS. 16B and 16D are time-aligned.

If a modulation technique is used which adds an offset to the AC side (e.g. THPWM/Third harmonic PWM, space vector PWM/SVPWM, discontinuous PWM/DPWM, etc.), then the offset that is added to the AC side may also be added to the DC side such that both sides produce identical common-mode voltage and thereby eliminate or reduce the circulating common-mode current at the frequency of the fundamental and its low-order harmonics. In control strategies that employ a per-phase control scheme (e.g., four-leg VSI), any voltage offset applied to the neutral leg (in order to maintain balanced phase voltages) may also be added to the DC side to produce identical common-mode voltage and thereby eliminate the circulating common-mode current at the frequency of the fundamental and its low-order harmonics.

Although the above discussion with regard to common-mode current through the AC-to-DC power converter 1600 refers to the topology shown in FIG. 16A, the same or similar techniques and principles apply to the topology shown in FIGS. 1-15. For example, in some embodiments, a neutral corresponding to the AC source 1690 may not be used. In such an example, the switching leg 1640 may not be used.

Figure 17:
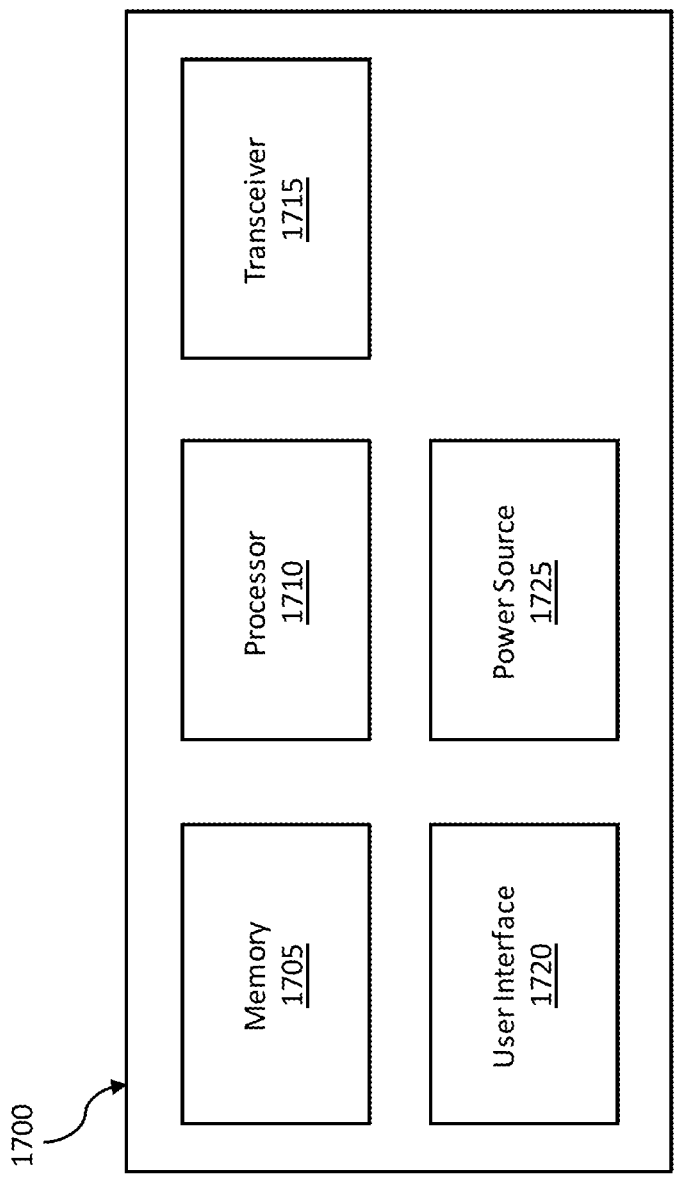
FIG. 17 is a block diagram of a computing device in accordance with an illustrative embodiment.

FIG. 17 is a block diagram of a computing device in accordance with an illustrative embodiment. An illustrative computing device 1700 includes a memory 1705, a processor 1710, a transceiver 1715, a user interface 1720, and a power source 1725. In alternative embodiments, additional, fewer, and/or different elements may be used. The computing device 1700 can be any suitable device described herein. For example, the computing device 1700 can be a controller that operates switches, such as the switches 115, 215, 315, and/or 415. The computing device 1700 can be used to implement one or more of the methods described herein.

In an illustrative embodiment, the memory 1705 is an electronic holding place or storage for information so that the information can be accessed by the processor 1710. The memory 1705 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 1700 may have one or more computer-readable media that use the same or a different memory media technology. The computing device 1700 may have one or more drives that support the loading of a memory medium such as a CD, a DVD, a flash memory card, etc.

In an illustrative embodiment, the processor 1710 executes instructions. The instructions may be carried out by a special purpose computer, logic circuits, or hardware circuits. The processor 1710 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 1710 executes an instruction, meaning that it performs the operations called for by that instruction. The processor 1710 operably couples with the user interface 1720, the transceiver 1715, the memory 1705, etc. to receive, to send, and to process information and to control the operations of the computing device 1700. The processor 1710 may retrieve a set of instructions from a permanent memory device such as a ROM device and copy the instructions in an executable form to a temporary memory device that is generally some form of RAM. An illustrative computing device 1700 may include a plurality of processors that use the same or a different processing technology. In an illustrative embodiment, the instructions may be stored in memory 1705.

In an illustrative embodiment, the transceiver 1715 is configured to receive and/or transmit information. In some embodiments, the transceiver 1715 communicates information via a wired connection, such as an Ethernet connection, one or more twisted pair wires, coaxial cables, fiber optic cables, etc. In some embodiments, the transceiver 1715 communicates information via a wireless connection using microwaves, infrared waves, radio waves, spread spectrum technologies, satellites, etc. The transceiver 1715 can be configured to communicate with another device using cellular networks, local area networks, wide area networks, the Internet, etc. In some embodiments, one or more of the elements of the computing device 1700 communicate via wired or wireless communications. In some embodiments, the transceiver 1715 provides an interface for presenting information from the computing device 1700 to external systems, users, or memory. For example, the transceiver 1715 may include an interface to a display, a printer, a speaker, etc. In an illustrative embodiment, the transceiver 1715 may also include alarm/indicator lights, a network interface, a disk drive, a computer memory device, etc. In an illustrative embodiment, the transceiver 1715 can receive information from external systems, users, memory, etc.

In an illustrative embodiment, the user interface 1720 is configured to receive and/or provide information from/to a user. The user interface 1720 can be any suitable user interface. The user interface 1720 can be an interface for receiving user input and/or machine instructions for entry into the computing device 1700. The user interface 1720 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 1700. The user interface 1720 can be used to navigate menus, adjust options, adjust settings, adjust display, etc.

The user interface 1720 can be configured to provide an interface for presenting information from the computing device 1700 to external systems, users, memory, etc. For example, the user interface 1720 can include an interface for a display, a printer, a speaker, alarm/indicator lights, a network interface, a disk drive, a computer memory device, etc. The user interface 1720 can include a color display, a cathode-ray tube (CRT), a liquid crystal display (LCD), a plasma display, an organic light-emitting diode (OLED) display, etc.

In an illustrative embodiment, the power source 1725 is configured to provide electrical power to one or more elements of the computing device 1700. In some embodiments, the power source 1725 includes an alternating power source, such as available line voltage (e.g., 120 Volts alternating current at 60 Hertz in the United States). The power source 1725 can include one or more transformers, rectifiers, etc. to convert electrical power into power useable by the one or more elements of the computing device 1700, such as 1.5 Volts, 8 Volts, 12 Volts, 24 Volts, etc. The power source 1725 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The invention claimed is:

1. An electrical power conversion system, comprising:
   a DC-to-DC power converter configured to receive a DC input power and provide a DC output power, the DC-to-DC power converter including:
      a positive input terminal;
      a negative input terminal;
      an input switch bank including a first switching leg and a second switching leg, wherein each of the first switching leg and the second switching leg is electrically connected directly across the positive input terminal and the negative input terminal;
      an output switch bank including a third switching leg and a fourth switching leg;

a positive secondary DC bus terminal extending between the input switch bank and the output switch bank;
a negative secondary DC bus terminal extending between the input switch bank and the output switch bank;
a positive output terminal extending from the output switch bank; and
a negative output terminal extending from the output switch bank;
wherein the positive secondary DC bus terminal is electrically connected to the first switching leg of the input switch bank;
wherein the negative secondary DC bus terminal is electrically connected to the second switching leg of the input switch bank;
wherein each of the third switching leg and the fourth switching leg is electrically connected across the positive secondary DC bus terminal and the negative secondary DC bus terminal without any intervening switching legs positioned between (i) the first switching leg and the second switching leg of the input switch bank and (ii) the third switching leg and the fourth switching leg of the output switch bank;
wherein the positive output terminal is electrically connected to the third switching leg of the output switch bank; and
wherein the negative output terminal is electrically connected to the fourth switching leg of the output switch bank.

2. The electrical power conversion system of claim 1, wherein the DC-to-DC power converter includes at least one filtering element positioned between the input switch bank and the output switch bank, the at least one filtering element including at least one of (i) one or more capacitors or (ii) one or more inductors.

3. The electrical power conversion system of claim 1, wherein the DC-to-DC power converter includes at least one of (i) a first inductor positioned in series with the positive input terminal, (ii) a second inductor positioned in series with the negative input terminal, (iii) a third inductor positioned in series with the positive output terminal, or (iv) a fourth inductor positioned in series with the negative output terminal.

4. The electrical power conversion system of claim 3, wherein the DC-to-DC power converter includes at least one of (i) the first inductor and the second inductor or (ii) the third inductor and the fourth inductor.

5. The electrical power conversion system of claim 1, wherein the DC-to-DC power converter includes:
at least one first capacitor positioned between the positive input terminal and the negative input terminal; and
at least one second capacitor positioned between the positive output terminal and the negative output terminal.

6. An electrical power conversion system, comprising:
a DC-to-DC power converter configured to receive a DC input power and provide a DC output power, the DC-to-DC power converter including:
a positive input terminal;
a negative input terminal, the positive input terminal and the negative input terminal configured to interface with a power source;
an input switch bank including a first switching leg and a second switching leg, wherein each of the first switching leg and the second switching leg is electrically connected directly across the positive input terminal and the negative input terminal without any intervening switching legs positioned between (i) the first switching leg and the second switching leg and (ii) the power source;
an output switch bank including a third switching leg and a fourth switching leg, wherein each of the first switching leg, the second switching leg, the third switching leg, and the fourth switching legs includes a switch;
a positive secondary DC bus terminal extending between the input switch bank and the output switch bank;
a negative secondary DC bus terminal extending between the input switch bank and the output switch bank;
a positive output terminal extending from the output switch bank; and
a negative output terminal extending from the output switch bank, the positive output terminal and the negative output terminal configured to interface with a load;
wherein each of the third switching leg and the fourth switching leg is electrically connected across the positive output terminal and the negative output terminal without any intervening switching legs positioned between (i) the third switching leg and the fourth switching leg and (ii) the load;
wherein the first switching leg is electrically connected to the fourth switching leg via the positive secondary DC bus terminal; and
wherein the second switching leg is electrically connected to the third switching leg via the negative secondary DC bus terminal.

7. The electrical power conversion system of claim 6, wherein the DC-to-DC power converter includes a filtering element electrically connected between the positive secondary DC bus terminal and the negative secondary DC bus terminal, the filtering element including at least one capacitor.

8. The electrical power conversion system of claim 6, wherein the DC-to-DC power converter includes at least one of (i) a first inductor positioned between the first switching leg and the positive secondary DC bus terminal or (ii) a second inductor positioned between the second switching leg and the negative secondary DC bus terminal.

9. The electrical power conversion system of claim 8, wherein the DC-to-DC power converter includes the first inductor and the second inductor.

10. The electrical power conversion system of claim 6, wherein the DC-to-DC power converter includes at least one capacitor connected between the positive input terminal and the negative input terminal.

11. The electrical power conversion system of claim 10, wherein the at least one capacitor includes two capacitors connected in series with one another between the positive input terminal and the negative input terminal, and wherein a ground is electrically connected between the two capacitors connected in series.

12. An electrical power conversion system, comprising:
a DC-to-DC power converter configured to receive a DC input power and provide a DC output power, the DC-to-DC power converter comprising:
a positive input terminal;
a negative input terminal;
a positive secondary DC bus terminal;
a negative secondary DC bus terminal;

a first switching leg extending directly between the positive input terminal and the negative input terminal, the first switching leg including a first switch in series with a second switch, the first switching leg connected to the positive secondary DC bus terminal;

a second switching leg extending between the positive input terminal and the negative input terminal, the second switching leg including a third switch in series with a fourth switch, the second switching leg connected to the negative secondary DC bus terminal;

a first inductor positioned between the first switching leg and the positive secondary DC bus terminal;

a second inductor positioned between the second switching leg and the negative secondary DC bus terminal; and a filtering element electrically connected between the positive input terminal and the negative input terminal, the filtering element including a capacitor.

13. The electrical power conversion system of claim 12, further comprising a second capacitor electrically connected between the positive secondary DC bus terminal and the negative secondary DC bus terminal.

* * * * *